(12) United States Patent
Miteva et al.

(10) Patent No.: US 7,969,646 B2
(45) Date of Patent: Jun. 28, 2011

(54) DISPLAY SYSTEM

(75) Inventors: Tzenka Miteva, Stuttgart (DE);
Gabriele Nelles, Stuttgart (DE);
Stanislav Balouchev, Mainz (DE);
Vladimir Yakutkin, Mainz (DE)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/314,121

(22) Filed: Dec. 4, 2008

(65) Prior Publication Data
US 2009/0224659 A1 Sep. 10, 2009

(30) Foreign Application Priority Data

Dec. 4, 2007 (EP) .................... 07023494

(51) Int. Cl.
*G02F 1/35* (2006.01)
*H01J 1/63* (2006.01)
(52) U.S. Cl. ...................... 359/326; 313/504
(58) Field of Classification Search .......... 359/326–332; 313/503, 504
See application file for complete search history.

(56) References Cited

U.S. PATENT DOCUMENTS

| 6,413,655 | B2 | 7/2002 | Otani et al. |
| 2005/0077817 | A1 | 4/2005 | Yamazaki et al. |
| 2005/0079385 | A1 | 4/2005 | Nomura et al. |
| 2009/0290211 | A1* | 11/2009 | Miteva et al. ............ 359/326 |

FOREIGN PATENT DOCUMENTS

| EP | 1 484 379 A1 | 8/2004 |
| WO | 2006/008068 A1 | 1/2006 |

OTHER PUBLICATIONS

U.S. Appl. No. 12/791,334, filed Jun. 1, 2010, Miteva, et al.*
U.S. Appl. No. 12/791,237, filed Jun. 1, 2010, Miteva, et al.*
U.S. Appl. No. 12/746,273, filed Jun. 4, 2010, Miteva, et al.*
S. Baluschev et al., "Two pathways for photon upconversion in model organic compound systems," J. of Applied Physics, vol. 101, American Institute of Physics, 2007.
S. Baluschev et al., "Upconversion photoluminescence in poly(ladder-type-pentaphenylene) doped with metal (II)-octaethyl porphyrins," Applied Physics Letters, vol. 86, American Institute of Physics, 2005.
S. Baluschev et al., "Rsponse to Comment on 'Two pathways for photon upconversion in model organic compound systems' [J. Appl. Phys. 101, 023101 (2007)]," J. of Applied Physics, vol. 102, American Institute of Physics, PTO-1449.DOC2007.

* cited by examiner

*Primary Examiner* — Daniel Petkovsek
(74) *Attorney, Agent, or Firm* — Oblon, Spivak, McClelland, Maier & Neustadt, L.L.P.

(57) ABSTRACT

The present invention relates to a display system based on photon energy up-conversion.

51 Claims, 31 Drawing Sheets

DISPLAY SYSTEM

BACKGROUND OF THE INVENTION

This application claims the benefit of European Patent Application Serial No. 07 023 494.3, filed on Dec. 4, 2007 the entire contents of which are incorporated herein by reference The present invention relates to a display system based on photon energy up-conversion.

In a number of systems, it has been observed that irradiation by light with longer wavelength causes emission of a light with shorter wavelength. This phenomenon, which is also related to as "frequency up-conversion" or shortly "up-conversion" is most often associated with high light intensities available from pulsed lasers. It is presently believed that the up-conversion process involves the energy transfer of several lower excited states to a single higher excited state which is then capable of emitting light with a shorter wavelength, i.e. higher energy. This process has been described for a number of inorganic systems in the solid state, including crystals, ion-doped glasses, thin films and nanoparticles. Usually the up-conversion process in the crystalline systems includes "sensitising" components, "activator" components and/or matrix (crystal) components. Typically the matrix is co-doped with rare earth ions, which act as "sensitizers" as well as "activators". One of the dopants absorbs in the low-wavelength region (typically infrared) whereupon the absorbed photon energies are then transferred to another dopand, the activator ions, which emit in the blue or green region (E. L. Falcao-Filho et al. J. Appl. Phys 92, 3065, (2002), Yoh Mita et al. Appl. Phys. Lett. 62, 802 (1992), Trash et al. Journal of OSA Bulletin 11, 881 (1994)). Furthermore crystalline nanoparticles have been described, a combination of which is dispersed in host matrices to form thin films. These crystalline nanoparticles also have been shown to be capable of energy up-conversion, which process takes place between the various species of nanoparticles and include an energy transfer step (e.g. U.S. Pat. No. 6,541,788) or the crystalline nanoparticles act as a matrix for other dopands such as $Eu^{3+}$-ions, $Tb^{3+}$-ions, $Tb^{3+}$-ions, $Ce^{3+}$-ions etc., and these dopands upon irradiation of light are capable of increasing the fluorescence intensity and quantum efficiency of the nanoparticles.

These systems are of potential interest for the fabrication of lasing materials, photovoltaic devices and so on. Due to the nature of the components involved they are, however, rather expensive in manufacture and furthermore not particularly suited for the preparation of for example, films over large areas or the preparation on flexible substrates, both of which should be particularly useful for the fabrication of commercially useful photovoltaic devices, such as solar cells.

One approach to address this problem was to use organic compounds, instead of inorganic ones. These organic up-conversion systems are all based on direct two-photon or multi-photon excitation and/or the excitation of molecules populating high vibrational states into a first excited state, which latter process is also sometimes referred to as "hot band-absorption". In the direct, i.e. simultaneous two-photo excitation the up-conversion is a result of a direct two-photon pumping of dyes with large two-photon absorption (TPA) cross-section, which dyes are either in solution or in films (including so called "solid" solutions, with inert polymers as an inactive matrix, i.e. a solid "solvent"). This inactive matrix is inactive in the sense that it does not take part in the up-conversion process whatsoever. Various systems have been described, and there is an ongoing search for new organic dyes with greater TPA-cross-section and TPA-dyes which are bound to polymer molecules or doped in polymer matrices (U.S. Pat. Nos. 5,912,257, 6,555,682, 6,100,405, T. Kojei et al. Chem. Phys. Lett. 298, 1 (1998), G. S. He et al., Appl. Phys. Lett 68, 3549 (1996) R. Schroeder et al., J. Phys.: Condens. Matter 13, L313 (2001); R. Schroder et al., J. Chem. Phys. 116, 3449 (2001)). Where TPA-dyes are doped in polymer matrices, again, the polymers are inactive compounds which do not take part in the up-conversion process.

Where the up-conversion is attributed to hot-band absorption, i.e. the excitation of molecules which populate high vibrational states, this has, in some cases been used for laser cooling of matter (J. L. Clark et al. Phys Rev. Lett 76, 2037 (1996)) and/or as a temperature probe of opto-electronic devices (J. M. Lupton, Appl. Phys. Lett 80, 186 (2002)).

Another area of research in the field of organic compounds is the field of "optical limiters". An optical limiting material shows non-linear absorption characteristics. This is due to the phenomenon that the cross-section of the excited state is large than that of the ground state. The larger the input energy the more molecules become excited into the state having a larger cross-section, thus resulting in an increasing absorption coefficient. Optical limiters based upon this nonlinear absorption on the picosecond and nanosecond time-scales have been reported for a number of materials, including metallophthalocyanins, porphyrins and fullerenes but also inorganic nanoparticles (Qureshi F M et al. Chem. Phys. 231, 87 (1998) and other references cited therein; Sun et al. Int. Rev. Phys. Chem. 18 (1) 43 (1999) and references cited therein; W. Su, T. M. Cooper; Chem. Mater. 10, 1212 (1998); J. W. Perry et al., Science 273, 1533 (1996); K. A. Nguen et al., J. Chem. Phys. 118, 5802 (2003).

In a number of bimolecular or multimolecular systems comprising at least one sensitizer component and at least one emitter component, photon energy up-conversion has been shown to occur based on triplet-triplet annihilation processes (Baluschev et al., Angew. Chem. Int. Ed., 2007, 46, 1-5). Such photon energy up-conversion is believed to be an inherently connected chain of three steps. The first step is inter system crossing (ISC) at the sensitizer molecules followed by the second step, namely the transfer of the excitation of the sensitizer triplet to the emitter triplet. The third step is a subsequent triplet-triplet annihilation mostly between emitter molecule triplets. An efficient triplet-triplet annihilation assisted photon energy up-conversion has been observed for a broad variety of metal complexes acting as sensitizers, and different emitter molecules. The main advantage of such triplet-triplet annihilation based photon energy up-conversion processes is their independence of coherent excitation light. Furthermore such triplet-triplet annihilation assisted photon energy up-conversion only requires excitation light having low intensity (as low as 1 W $cm^{-2}$) and low spectral power density (as low as 600 µW $nm^{-1}$). These studies based on triplet-triplet annihilation assisted photon energy up-conversion have been performed in solution.

None of the aforementioned organic systems, however, have proved to be particularly versatile due to the inherent characteristics of the up-converting material present in the corresponding system or due to the delicate nature of the entire set-up which made their use in practical applications and devices virtually impossible. Furthermore in some cases, especially the systems based on inorganic components, up-conversion could only be induced under conditions of very low temperatures, −180° C. and below. Also, none of the optical limiting materials has been reported to show up-converting behaviour when this material is on its own. The inorganic based systems work only with high intensity monochromatic laser light, normally in the order of kW/$cm^2$, have low efficiencies which have so far only been reported for crystalline powders as ca. 1% to a maximum of 4% but these values apply only when high intensities of light are used (Page et al., 1998, J. Opt. Soc. Am. B, Vol. 15, No. 3, 996). Furthermore the systems reported so far only have emission characteristics which are intrinsic to the used corresponding materials, without any possibility to influence the ratio of emitted wavelengths.

The inorganic systems are based on crystalline materials and in order to be used in applications nanocrystals have to be specially prepared which would then be applied in a film, or, alternatively, the crystals would be ground into a fine powder and then distributed in a film, which, in turn causes problems with the even distribution of the crystalline powder within the film. Accordingly, the use of the afore-mentioned systems in display systems has been very difficult to achieve, due to either the delicate nature or to the inherent characteristics of the up-conversion system.

Accordingly it has been an object of the present invention to provide for a display system based on photon energy up-conversion which shows a great versatility with respect to the radiation wavelengths involved, both incident and emitted and which may therefore be tailor-made depending on the desired excitation and/or emission characteristics. Furthermore it has been an object of the present invention to provide for a display system which is suitable for large areas, thereby enabling the production of tailor-made displays. It has also been an object of the present invention to provide for a display system that allows to make efficient use of low intensity or low spectral density light sources, such as the sun, and which may therefore be used as an efficient display system.

The objects of the present invention are solved by a display system comprising:
  a medium that is light-emitting upon excitation with light,
  a light source for providing excitation light to be directed at said medium,
  a control device for controlling the distribution and, optionally, the modulation of the excitation light to be directed at said medium,
  a computer for controlling said light source and said control device, said medium being either in contact with at least one light transparent substrate, or said medium being shaped in a desired three-dimensional shape,
wherein said medium is capable of photon energy up-conversion and comprises at least two components and a matrix in which said at least two components are distributed, wherein said first component and said second component are organic compounds and act as a pair of sensitizer component and corresponding emissive component, respectively, and wherein said first component and said second component are distributed in said matrix which matrix is a solid, a gel or a fluid with a viscosity equal or higher than $0.59 \times 10^{-3}$ Pa·s.

Preferably, said light source is selected from lasers, light emitting diodes (LEDs), organic light emitting diodes (OLEDs), the sun, wherein, optionally, sun light has been collimated or coupled into an optical fibre that is directed towards said medium.

In one embodiment said control device is selected from an acousto-optic modulator, a set of galvanic- or opto-mechanic- or piezo-scanned mirrors, a rotating polygon prism, a piezo-scanned up-conversion screen, a set of waveguides, and a set of masks and/or holograms for light-field modulation.

In one embodiment said light source provides excitation light of a range of wavelengths.

In one embodiment said display system comprises at least two light sources each of which provides excitation light of the same range of wavelengths or of different ranges of wavelengths.

In one embodiment said first component is capable of absorbing light at a first wavelength region $w \leq \lambda_1 \leq x$, which first component acts as a sensitizer in said medium, wherein said second component is capable of emitting light at a second wavelength region $y \leq \lambda_2 \leq z$, which second component acts as an emissive component in said medium, wherein $\lambda_2 \leq \lambda_1$, and wherein, upon absorption of light by said sensitizer component at said first wavelength region $\lambda_1$, said emissive component emits light at said second wavelength region $\lambda_2$, wherein, preferably, said display system comprises more than one pair of a sensitizer component and a corresponding emissive component, respectively.

More preferably said pairs of sensitizer component and corresponding emissive component are different from each other in terms of their respective absorption and emission wavelengths, and each pair is present in said medium in a defined region, e.g. in a defined layer or pixel within said medium.

In one embodiment said medium comprises several layers, each layer being formed of said matrix, and in each layer a pair of a sensitizer component and a corresponding emissive component is present.

In one embodiment said medium is in contact and distributed over at least one light transparent substrate, wherein, preferably, said medium is sandwiched between two substrates, at least one of which is light transparent.

In one embodiment said substrate(s) is (are, independently, at each occurrence) a solid substrate, preferably selected from glass, quartz, silicon nitride or carbide, sheets of any of the foregoing, or a flexible substrate, such as a polymer sheet or a plastic foil.

In one embodiment said medium is shaped in a desired shape such as a ball, a cube, a letter, a numeral, a symbol, a logo, a paralleliped or an irregularly shaped object.

In one embodiment said display system is an RGB display or a variable color display or a white display.

In one embodiment said matrix is transparent in the range from 300 nm to 1600 nm.

In one embodiment said fluid has a viscosity in the range of from $0.59 \times 10^{-3}$ to $1 \times 10^6$ Pa·s.

In one embodiment said matrix is a solid with elastic, plastic, viscoelastic or viscoplastic properties.

In another embodiment said matrix is an organic or inorganic glass with a viscosity $1 \times 103$ to $1 \times 1017$ Pa·s.

In one embodiment said matrix is a viscous liquid having a viscosity $\geq 0.59 \times 10-3$ Pa·s, wherein, preferably, said matrix is made of one or several materials selected from the following organic oligomers, said oligomers having a finite number of monomeric units, and co-oligomers, said co-oligomers being comprised of a mixture of monomeric units, said monomeric units including, but not being limited to the class of substituted or non-substituted styrenes, phenylenes, phenylene diamines, phenylene diols, methyl methacrylates, phenols, acrylic acids, vinyls, such as vinyl alcohol or vinyl chloride, lactic acids, carbohydrates, carbonates, imides, amides, such as acryl amide, olefins, such as ethylene and propylene, olefin oxides, such as ethylene oxide or propylene oxide, olefin glycols, such as ethylene glycol and propylene glycol, terephthalic acids, epsilon-caprolactams, urethanes, silanes, siloxanes and substituted and functionalised forms of any of the foregoing, and any combination thereof, said matrix optionally and additionally including one or several organic solvents or water to vary, adjust and control the viscosity of said medium.

In one embodiment said matrix is an inorganic or organic gel having a viscosity $\geqq 1\text{-x }10\text{-}1$ Pa·s, wherein, preferably, said organic gel is an organic physical gel having non-covalent bonds or is a chemical gel having covalent bonds and preferably being crosslinked wherein crosslinking is achieved by irradiation or by addition of crosslinking chemicals or both.

In one embodiment said gel contains one or several linear and branched polymers, including, but not limited to poly (styrenes), (poly)phenylenes, poly(naphthalate), poly (terephthalate), poly(olefin-naphthalate) and poly(olefin-terephthalate), such as poly(ethylene naphthalate), poly (ethylene terephthale), poly(ether imides), poly(ether ketones), poly(hydroxyl-butyrates), poly(phenylene diamines), poly(phenylene diols), poly(methyl methacrylates), poly(phenols), poly(acrylic acids), poly(vinyls), such as poly(vinyl alcohols) or poly(vinyl chlorides), poly(lactic acids), poly(carbohydrates), poly(carbonate), poly(imide), poly(amide), such as poly(acryl amide), olefins, such as poly (ethylene) and poly(propylene), poly(olefin oxides), such as poly(ethylene oxide) or poly(propylene oxide), poly(olefin glycols), such as poly(ethylene glycol) and poly(propylene glycol), poly(terephthalic acids), poly(epsilon-caprolactam), poly(urethanes), polysilanes, poly(siloxanes) and combinations, mixtures or blends of any of the foregoing, said matrix optionally and additionally including one or several organic solvents or water to vary, adjust and control the viscosity of said medium.

In one embodiment said matrix is a solid or glass having a viscosity $\geqq 1\times 103$ Pa·s, wherein, preferably, said matrix is made of a thermoplastic polymer or copolymer (block, alternating and/or graft copolymers) or a mixture thereof and/or with one or several suitable solvent to control and adjust viscoelasticity or plastoelasticity of said.

More preferably, said matrix is made of polymer or copolymer, including block, alternating and/or graft copolymers with molecular weights from 102 to 109, preferably 103 to ca. 109, including but not limited to poly(styrenes), (poly)phenylenes, poly(naphthalate), poly(terephthalate), poly(olefin-naphthalate) and poly(olefin-terephthalate), such as poly(ethylene naphthalate), poly(ethylene terephthale), poly(ether imides), poly(ether ketones); poly(hydroxyl-butyrates), poly (phenylene diamines), poly(phenylene diols), poly(methyl methacrylates), poly(phenols), poly(acrylic acids), poly(vinyls), such as poly(vinyl alcohols) or poly(vinyl chlorides), poly(lactic acids), poly(carbohydrates), poly(carbonate), poly(imide), poly(amide), such as poly(acryl amide), olefins, such as poly(ethylene) and poly(propylene), poly(olefin oxides), such as poly(ethylene oxide) or poly(propylene oxide), poly(olefin glycols), such as poly(ethylene glycol) and poly(propylene glycol), poly(terephthalic acids), poly (epsilon-caprolactam), poly(urethanes), poly(silanes), poly (siloxanes) and combinations, mixtures or blends of any of the foregoing, said matrix optionally and additionally including one or several organic solvents or water to vary, adjust and control the viscosity of said medium.

In one embodiment said matrix is made of a thermosetting plastic, wherein, preferably, said thermosetting plastic is selected from polyester resins, epoxy resins, preferably two-component epoxy resins, acrylics, polyimides, melamine resins, and phenol-formaldehyde resins.

In one embodiment said matrix is made of an elastic solid and more specifically a polymer elastomer, wherein, preferably, said matrix is made of an elastic solid and more specifically a polymer elastomer selected from polyacrylic rubbers, silicone rubbers, fluorosilicone rubbers, fluoroelastomers, perfluoroelastomers, polyether-block-amides, and olefin rubbers.

In one embodiment said matrix does not take part in a photon energy up-conversion process upon irradiation of said medium.

In one embodiment said first component is a first organic compound and said second component is a second organic compound.

In one embodiment said first component is neither covalently bonded nor complexed to said second component.

In one embodiment said first component is covalently bonded or complexed to said second component.

In one embodiment said first and said second organic compounds are different compounds.

In one embodiment said first and said second organic compound is a carbon-containing compound, with the proviso that it is not a hydrogen-free chalcogenide of carbon, a derivative thereof, a salt-like carbide, a metallic carbide or a metal-carbonyl.

In one embodiment said emissive component's emitting light at said second wavelength region $\lambda 2$ is due to an up-conversion process based on direct or sequential two-photon excitation or on direct or sequential multi-photon excitation or on excitation of molecules populating high vibrational state(s) ("hot-band absorption"), which up-conversion process occurs upon absorption of light by said first component at said first wavelength region $\lambda 1$.

In one embodiment said emissive component's emitting light at said second wavelength region $\lambda 2$ is due to an up-conversion process based on a triplet-triplet annihilation process between photoexcited molecules of said emissive component and/or based on a triplet-triplet annihilation process between photo-excited molecules of said first component.

In one embodiment said second wavelength region $\lambda 2$ is in the range 360-750 nm and said first wavelength region $\lambda 1$ is in the range 500-1600 nm.

In one embodiment said first component is an organic dye or molecule having a populated triplet or mixed triplet-singlet state, a two-photon-absorbing (TPA)-dye, an optical limiting compound, another molecule with a populated triplet state or an optical limiting compound—e.g. a fullerene, or carbon nanotubes.

In one embodiment said second component is an organic dye.

In one embodiment said first component is a first organic dye and said second component is a second organic dye, wherein said first and second organic dyes are the same or different, wherein, preferably, said first and/or said second organic dye is selected from the group comprising organic dyes with populated triplet states or capable of direct and/or sequential two-photon excitation, organic dyes capable of direct and/or multi-photon excitation, organic dyes capable of non-linear absorption and organic dyes capable of hot-band absorption.

In one embodiment said organic dye, in particular said first organic dye, is selected from the group comprising organic molecules having populated triplet states and especially metal-organic complexes having populated triplet states, for example but not limited to Li, Mg, Al, Ti, V(VO), Mn, Fe, Co, Ni, Cu, Zn, Ga, Ru, Pd, Ag, Re, Os, Ir, Pt, Pb, U(UO2), containing organic complexes, or any combination of the foregoing to ensure wavelength control, wherein, preferably, said first organic dye is selected from the group comprising compounds with a populated triplet state, including but not limited to porphyrins, including extended porphyrins, substituted porphyrins and any of the foregoing porphyrins containing metals including but not limited to Li, Mg, Al, Ti, V(VO), Mn, Fe, Co, Ni, Cu, Zn, Ga, Ru, Pd, Ag, Re, Os, Ir, Pt, Pb, U(UO2), -phtalocyanines, including extended phtalocyanines, substituted phtalocyanines, and any of the foregoing phtalocyanines containing metals including but not limited to Li, Mg, Al, Ti, V(VO), Mn, Fe, Co, Ni, Cu, Zn, Ga, Ru, Pd, Ag, Re, Os, Ir, Pt, Pb, U(UO2), benzopyridines, benzopyrizines, quinolates and hydroxyquinolates, acetyl-acetonates, substituted benzopyridines, benzopyrizines, quinolates and hydroxyquinolates, acetyl-acetonates; —mixtures of any of the foregoing, and said second organic dye is selected from the group comprising compounds showing fluorescence emission in the range of from 360 to 750 nm, in particular fluorescent dyes showing fluorescence emission in the range of from 360 nm to 750 nm, e.g. anthracenes, tetracenes, pentacenes, perylenes substituted anthracenes, tetracenes, pentacenes, perylenes phenyl (bi-, tri-phenyl)-bridged anthracenes, tetracenes, pentacenes, perylenes fluorenes, thiophenes, polyfluorenes and oligofluorenes, with or without any sidechain pattern and their copolymers, polyparaphenylenes, including polyparaphenylene vinylene, and polyphenyleneethinylenes.

In one embodiment said first and said second organic dye are chosen such that a populated triplet state of said first organic dye is at an energy level allowing a triplet-triplet annihilation process and the subsequent transfer of energy to an excited singlet state of said second dye.

In one embodiment combinations of said first and second component are selected from the following:

a) Green couple: DPA/PdOEP; (i.e. 9,10-diphenylanthracene (DPA)/2,7,8,12,13,17,18-octaethylporphyrin Palladium (PdOEP))

b) Red couple: BPEA/PdTPTBP; (i.e. 9,10-Bis(phenylethynyl)anthracene (BPEA)/meso-Tetraphenyl-tetrabenzoporphyrin Palladium (PdTPTBP))

c) Near infra red couple: BPEN/PdTPTNP; (i.e. 9,10-Bis(phenylethynyl)naphthacene (BPEN)/meso-Tetraphenyl-octamethoxide-tetranaphtho[2,3]porphyrin Palladium (PdTPTNP))

d) Direct Red-to-Blue couple: Perylene/PdTPTBP:; (i.e. Dibenz[de,kl]anthracene (Perylene)/meso-Tetraphenyl-tetrabenzoporphyrin Palladium (PdTPTBP))

e) Direct Infrared-to-Green couple: BPBT/PdTPTNP:; (i.e. 4,4'-bis(5-tetracenyl)-1,1'-biphenylene (BPBT)/meso-Tetraphenyl-octamethoxide-tetranaphtho[2,3]porphyrin Palladium (PdTPTNP))

f) Infrared-to-yellow couple: Rubrene/PdTAP; (i.e. 5,6,11,12-Tetraphenylnaphthacene (Rubrene)/Tetraantraporphyrin Palladium (PdTAP)).

In one embodiment said first and said second components are homogeneously distributed within said matrix.

In one embodiment said first and said second components are encapsulated in particles having average dimensions in the range of from 5 nm to 999 µm, and such particles are homogeneously distributed within said matrix, wherein, preferably, said particles have average dimensions in the range of from 10 nm to 999 µm.

In one embodiment said particles have a surface which is functionalized by functional groups to allow distribution of said particles within said matrix, said functional groups preferably being H, —(CH2)nCH3, —(CH2)n-COOR, —(CH2)n-OR, —(CH2)n-SR, —(CH2)n—NR2, —((CH2)p-O)n—CH3, with R=H, substituted or non-substituted alkenyl or alkynyl, or halogen, such as Cl, Br, F, I, or NO2, NH2, CN, SO3H, OH.

All of the organic systems of the prior art reported above are based on a solution matrix, i.e. a matrix where the active components are present within a solvent. Hence their application in devices is difficult and requires sealed compartments. The present inventors have managed to devise media for photon energy up-conversion which are based on organic sensitizers and emitters which comprise a matrix that allows the deposition of such media as a film over extended areas without the need to seal the compartment in which the sensitizer and emitter are located or to undertake any measures to avoid leakage of solvents. Furthermore the media according to the present invention allow to form three dimensional shapes thereof, which may then for example be used as displays or windows or objects which convert light of a longer wavelength into light of a shorter wavelength. The present inventors have surprisingly found that if one embeds and distributes organic sensitizer compounds and organic emitter compounds in a matrix which matrix is a solid, a gel or a fluid with viscosity equal or higher than $0.59 \times 10^{-3}$ Pa·s, preferably $>1.0 \times 10^{-3}$ Pa·s, even more preferably $>3.0 \times 10^{-3}$ Pa·s, the medium comprising such matrix, sensitizer and emitter is well suited to be used in a number of applications, including large area displays or windows. This is because the solid, gel or highly viscous matrix allows the medium to retain its shape once it has been brought into a desired form, such as a sheet. The term "highly viscous", as used herein is meant to refer to a viscosity of $\geqq 0.59 \times 10^{-3}$ Pa·s, preferably $>1.0 \times 10^{-3}$ Pa·s, even more preferably $>3.0 \times 10^{-3}$ Pa·s. The value of $\geqq 0.59 \times 10^{-3}$ Pa·s is the viscosity of toluene at room temperature under ambient conditions. The viscosity of the matrix in accordance with the present invention should be at least equal to such value, as any value below would inevitably lead to the same problems that are associated with the prior art (lack of form stability, leakage, no large area devices possible etc.).

The present inventors have surprisingly found that in using organic sensitizer and emissive components for photon energy up-conversion in a matrix which is a solid, a gel or a fluid with a viscosity $\geqq 0.59 \times 10^{-3}$ Pa·s, in a display system, the production of highly versatile displays can be achieved. These displays, in accordance with the present invention, are characterized by high efficiencies. As excitation sources, a large variety of such excitation sources are possible, and the display systems in accordance with the present invention do not necessarily rely on high intensity monochromatic laser light. On the contrary, even the sun may be used as an excitation source. For example, parts of the solar spectrum, such as the red or the near-infrared (IR) region as excitation source may be used and, depending on the choice of emissive component(s) monochromatic emissive displays, such as blue, green, yellow or red emissive displays, as well as multicolor emissive displays, may be produced. It is possible to provide the sensitizer/emissive component pair(s) in different layers in a multilayer arrangement and/or in different pixels, and, in doing so, variety of displays may be achieved, such as an RGB display, a white display or a display of other defined color. The displays in accordance with the present invention have a high frequency refresh rate, up to 100 MHz.

The media and the display systems of the present invention work with non-coherent sun-light with intensities as low 10 mW/cm2 and have higher efficiencies, i.e. around 5-6%, even when working with solar light as excitation source having a spectral density as low as 50 µW nm-1. Moreover, the quantum efficiency of the up-conversion process in accordance with the present invention does not depend on the coherent properties of the excitation light:

Excitation photons may be used for photon energy up-conversion in accordance with the present invention, which excitation photons may have a with a time mismatch around 40 µs, depending on the life time of the excited emitter triplet states. Moreover the excitation photons may be from an excitation energy region more than 0.3 eV broad, depending on the width of the sensitizer absorption spectrum, and the excitation photons may have a spatial separation more than 20 µm depending on the specific diffusion coefficients of the sensitizer and emitter molecules. This allows that the media according to the present invention may be used as spectrum concentrators.

Furthermore there are no requirements for the wave front of the excitation light, as the photons may have random orientation in space (until they hit the target, e.g. the display surface).

Moreover the components within the media of the present invention are highly versatile in the sense that one may not only influence the active components, i.e. the components taking part in the photon energy up-conversion process, which allows control over the spectral properties of the medium, but also the composition of the matrix to ensure controlled morphology of the medium and the film or object formed thereof.

By the present invention a greater versatility is achieved in that the possibility to combine the properties of at least two independently active compounds, a new system/composition is created having a variety of properties which are not shown by each component, when on its own. For example, the absorbing molecules, i.e. "sensitizer" molecules can be varied, whereby the lower energy wavelengths to be up-converted can be varied. Alternatively or in addition thereto, the emissive molecule can be varied thereby allowing a variation of the higher energy wavelengths of the up-converted emission. In using at least one organic compound, either as sensitizer or as emitter, or by using organic compounds for both, it is also possible to make use of the good film-forming properties of organic compounds thereby making the compositions according to the present invention particularly amenable for large-area opto-electronic devices, such as large area displays or displays based on flexible substrates.

The term "display system", as used herein, is meant to refer to one or several display devices. In its simplest form, a "display system" is to be equated with a single "display" or "display device". In a more elaborate form, several such single displays may be assembled together to form a display system in accordance with the present invention.

The term "light", as used herein, is meant to refer to electromagnetic radiation in the wavelength range of from 300 nm to 1600 nm and any subset thereof.

A substrate that is "light transparent" is meant to refer to a substrate that is transparent in at least those wavelength regions used for exciting the photon energy up-conversion medium and the wavelength region in which said photon energy up-conversion medium emits radiation. The displays in accordance with the present invention are either formed as a film or layer structure or a multi-film or multi-layer structure of the photon energy up-conversion medium in contact with at least one substrate. Preferably, such medium is sandwiched between two substrates. The layered medium may have more than one layer and may also have more than one sensitizer/emitter component pair, with each pair having different emission characteristics. These different sensitizer/emitter component pairs may be present in different layers or different pixels of a display, thereby allowing for the production of RGB displays, mono-color or multicolor displays or white displays.

In alternative embodiments of displays in accordance with the present invention, the photon energy up-conversion medium may be formed in a desired three-dimensional shape, such as a letter, a numeral, a cube, a pyramid, a parallelepiped, a company's logo, or any other regular or irregular shaped desired shape. This is possible due to the form-stable nature of the photon energy up-conversion media in accordance with the present invention.

As outlined previously, the displays in accordance with the present invention may work with a large variety of light sources. A light source useful for providing excitation light in accordance with the present invention provides light of a single wavelength (monochromatic light) or of an entire range of wavelengths, such as red light or near-infrared (IR) light. Likewise, there may also be used more than one light source as excitation source providing different wavelength ranges as excitation light. In particular, such an arrangement may be chosen, if there is more than one sensitizer/emitter component pair present, each pair being characterized by a different absorption/emission wavelength. In this way, multicolor displays may be produced.

The term "transparent in the range of from x nm to y nm", as used herein is meant to refer to transparency over the entire range or only a subset thereof.

The term "elastic" when used herein in connection with the matrix is meant to refer to a matrix which, upon deformation e.g. by the exertion of pressure or stress, returns to its original state which it had prior to said deformation, once such pressure or stress is released.

The term "plastic" when used herein in connection with the matrix is meant to refer to a matrix which undergoes a non-reversible change of shape in response to an applied force.

The term "viscoelastic" as used herein, is a time-dependent property in which a material under stress produces both a viscous and an elastic response. A viscoelastic material will exhibit viscous flow under constant stress, but a portion of mechanical energy is conserved and recovered after stress is released. Often associated with polymer solutions, melts and structured suspensions, viscoelastic properties are usually measured as responses to an instantaneously applied or removed constant stress or strain or a dynamic stress or strain. The term "viscoplastic", as used herein is a property in which a material behaves like a solid below some critical stress value, the yield stress, but flows like a viscous liquid when this stress is exceeded. Often associated with highly aggregated suspensions and polymer gels.

A "thermoplastic polymer" as used herein is a polymer which shows plastic behavior in dependence on the temperature, i.e. it melts when heated and solidifies when cooled.

A "thermosetting plastic" as used herein is meant to refer to a plastic material, e.g. a polymer that cures into a stronger form through the application of energy, e.g. heat. Usually such curing process results in the formation of crosslinking bonds between the molecules of the plastic material, e.g. the polymer chains.

The term "viscosity", as used herein, is meant to refer to a material's tendency to resist flow.

A "two-component epoxy resin" as used herein is meant to refer to an epoxy resin which is only formed if two precursor components are added together. More specifically, such an epoxy resin is a thermosetting epoxide polymer that cures when mixed with a catalysing agent or "hardener". Examples for such a "two-component epoxy resin" are bisphenol A and epichlorohydrin.

The term "viscous liquid" as used herein is meant to refer to a liquid having a viscosity $\geqq 0.59 \times 10^{-3}$ Pa·s. The person skilled in the art knows how to measure viscosity of liquids, and there are viscometers commercially available. In some embodiments reported further below in the examples, the present inventors used approximately $(20 \text{ to } 1000) \times 10^{-3}$ Pa·s. as viscosity value for the matrix. However, the way of measuring such viscosity should be less significant, as all of the known viscometers give the same results within boundaries of 10%.

As used herein the term "gel" usually refers to a system wherein one (or several) component(s) (also termed as "network component(s)") is(are) dispersed as a colloid in another component, such as a solvent. Preferably, a "gel" is a colloidal system with a finite, usually rather small yield stress.

For example, in a polymer gel, the network component is a polymer, and the polymer may be colloidally dispersed in a solvent such as water to form a gel. The polymer network may be a network formed by covalent bonds or by physical aggregation with regions of local order acting as network junctions. The gel may be physical in which case the interactions between the molecules of the dispersed component(s) are non-covalent in nature, e.g. van der Waals interactions, or it may be chemical in which case the interactions between the molecules of the dispersed component(s) are covalent. Optionally the component may be physically or chemically crosslinked. In the case of physical crosslinking, there are no covalent bonds between the molecules but the dispersed component(s) is (are) physically intertwined. In the case of chemical crosslinking there are covalent bonds between the molecules of the dispersed component(s), which have been achieved by irradiation or the addition of chemical crosslinking agents.

As used herein the term "organic" is used in its generally understood meaning, i.e. it refers to compounds which are carbon-containing compounds. As it is used here, it also includes elemental carbon, at least in the form of fullerenes. The term "organic" is further meant to exclude specific carbon-containing compounds such as: hydrogen-free chalkogenides of carbon, e.g. $CO$, $CO_2$, $CS_2$, and derivatives thereof, e.g. $H_2CO_3$, $KSCN$; further excluded are salt-like carbides which are binary compounds of elements with carbon, which decompose to hydrocarbons under the influence of water or dilute acids. Salt-like carbides have the general formula $M^I_2C_2$ or $M^{II}C_2$, wherein $M^I$ or $M^{II}$ denotes a metal ion with one or two valences. Salt-like carbides of calcium, silver and copper decompose to acetylene, the salt-like carbide of aluminium ($Al_4C_3$) decomposes to methane. Further excluded carbon-containing compound which do not form part of the term "organic" are metallic carbides, which are non-stoichiometric compounds having the character of an alloy. They are resistant to acids and are electrically conducting.

In accordance with the present invention, the sensitizer and emitter component(s) may be encapsulated in particles having average dimensions in the nanometer or micrometer range. If the average dimensions are in the nanometer range such particles are also sometimes herein referred to as "nanoparticles". The person skilled in the art knows how to encapsulate components in particles. There are a number of ways to encapsulate components in particles, e.g. encapsulation by emulsification techniques. As used herein, the term "nanoparticles" is meant to denote particles which have a size in the range of 1-750 nm, preferably 5-500 nm, or more preferably 5-250 nm. These nanoparticles may also exhibit crystalline behavior in which case they are also referred to as "nanocrystals".

As used herein, the term "nanotubes" is meant to denote tube-like structures preferably of carbon, the dimensions of which are of the same order of magnitude as of "nanoparticles", as defined above.

As used herein the terms "host molecules" and "guest molecules" are meant to denote two types of molecule, different from each other, wherein the molecules, which are referred to as "guest molecules", are embedded in a matrix formed by the (other) molecules, referred to as "host molecules".

The term "display system", as used herein, is meant to refer to one or several display devices. In its simplest form, a display system" is to be equated with a single "display" or display device". In a more elaborate form, several such single displays may be assembled together to form a display system in accordance with the present invention.

The term "light", as used herein, is meant to refer to electromagnetic radiation in the wavelength range of from 300 nm to 1600 nm and any subset thereof.

In the devices according to the present invention involving substrates (flexible solid or rigid solid), such substrate(s) are preferably "light transparent". A substrate that is "light transparent" is meant to refer to a substrate that is transparent in at least those wavelength regions used for exciting the photon energy up-conversion medium and the wavelength region in which said photon energy up-conversion medium emits radiation. The displays in accordance with the present invention are either formed as a film or layer structure or a multi-film or multi-layer structure of the photon energy up-conversion medium in contact with at least one substrate. Preferably such medium is sandwiched between two substrates, at least one of which, preferably both are light transparent. The layered medium may have more than one layer and may also have more than one sensitizer/emitter component pair, with each pair having different absorption characteristics or different emission characteristics or both different absorption and emission characteristics. These different sensitizer/emitter component pairs may be present in different layers or different pixels of a display, thereby allowing for the production of RGB displays, monocolor or multicolor displays or white displays.

In alternative embodiments of displays in accordance with the present invention, the photon energy up-conversion medium may be formed in a desired three-dimensional shape, such as a letter, a numeral, a cube, a pyramid, a paralleliped, a company's logo, or any other regular or irregular shaped desired shape. This is possible due to the form-stable nature of the photon energy up-conversion media in accordance with the present invention.

Without wishing to be bound by any theory, the principles of operation of the up-conversion process in accordance with one embodiment of a triplet-triplet annihilation assisted photon energy up-conversion system of the present invention is that after absorption of a photon in a singlet Q-band of the first component, e.g. a metallated porphyrin macrocycle (MOEP), due to an effective inter-system crossing (ISC), the long lived triplet state of the first component (sensitizer) is highly populated. This triplet state can further be considered as a reservoir of excited states for subsequent energy transfer processes. From here, two excitation pathways are possible. First, as a consequence of a triplet-triplet annihilation (TTA) process between the excited molecules of said first component themselves, one of the first component-molecules returns to the ground state and the other is excited into a higher singlet state. This is followed by an effective transfer of the first component singlet excitation to the excited singlet state of the second component, which is the emissive component, such as a blue emitter. Secondly, an additional up-conversion-channel is possible, comprising firstly a transfer of the triplet excitation of the first component directly to the triplet state of the second emissive component's molecules, followed again by effective triplet-triplet-annihilation, this time of the second component triplet states, resulting again in an excited singlet state of the second (emissive) component.

More preferably, said first organic dye (i.e. sensitizer) is a porphyrin, or a metalloporphyrin in particular octaethylporphyrin-Palladium (or -Pt or -Cu or -Zn), or a phthalocyanin, and said second organic dye (i.e. emitter) is a polyfluorene or oligofluorene (with or without (different) side chain patterns), in particular PF 2/6. It should be noted that, in one embodiment of the present invention, where the sensitizer and the emitter are organic compounds, which may be polymerisable, these may be occurring in the same polymer, i.e. they may form part of the same polymer molecule, either as block copolymer or random copolymer or a sensitizer/or emitter polymer wherein the respective other component forms end-capping groups. This may e.g. be a polymer of sensitizer components which is end-capped with emitter components, or vice versa. Polymers as just described are examples of where the two components are covalently bonded to each other.

Specific embodiments of preferred sensitizer components, emissive components and the matrix components ("inert matrix" referring to the fact that this is matrix does not take part in the up- or down-conversion or down-shifting processes) are described in the following:

Sensitizer molecules (or "sensitizer components")

A "sensitizer" is a molecule which is able to absorb light, the sensitizer being either an organic dye or a metal-organic complex, preferably with a high populated triplet states.

A metal-organic complex is per definition a compound containing at least a metal M surrounded by one or more molecules, the so-called ligands L which are generally bound to the metal ion by a coordinate covalent bond.

The ligands are organic molecules, cyclic or acyclic, aromatic or non-aromatic, monodentate or polydentate.

In case they are extended aromatic systems they are themselves organic dye sensitizers without being bound to a metal.

For better understanding:

Both, the Pd-porphyrine (=metal organic complex) but also the metal-free porphyrine (=Organic molecule) are sensitizers.

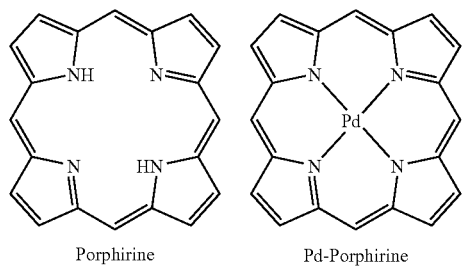

Porphirine          Pd-Porphirine

The metal-organic complexes can be mononuclear with the general structure $ML_m$ with m being the numer of ligands m=1-8, preferably 1-3 or polynuclear complexes with metals bridge via a common ligand B with general structure $L_mM$-$[B-ML_m]_n$, with Lm, at each occurrence in this formula, being an independently selected ligand.

n being the repeating unit 1-10, preferably 1-3 and with B being any bridging organic molecule acting as polydentate ligand or a halogenide such as F, Cl, Br, I polynuclear complexes with ligands bridged via A with general structure $ML_m$-$[A-L_mM]_n$, with Lm, at each occurrence in this formula, being an independently selected ligand.

n being the repeating unit 1-6, preferably 1-3 and with A being defined as

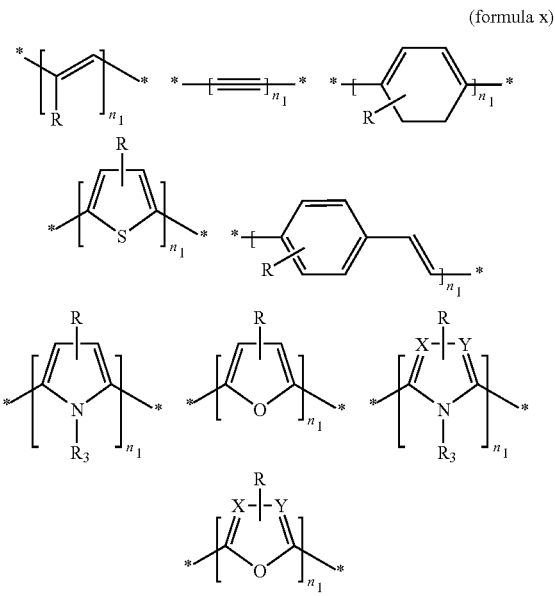

(formula x)

or any combination of these units, or any other organic unit forming fused system while bridging the ligands R being H, any substituted or non-substituted alkyl, aryl or heteroaryl $n_1$ being 0-10, preferably O-2

$R_3$ being H, $-(CH_2)_nCH_3$, $-(CH_2)_n-COOR$, $-(CH_2)_n-OR$, $-(CH_2)_n-SR$, $-(CH_2)_n-NR_2$, $-((CH_2)_p-O)_n-CH_3$, The metal M is selected for example, from Li, Na, K, Mg, Ca, Sr, Al, Ga, In, Ti, Sn, Pb, Zr, Hf, V, Nb, Cr, Mo, W, Mn, Re, Fe, Ru, Os, Co, Rh, Ir, Ni, Pd, Pt, Cu, Ag, Au, Zn, Cd, Hg, Yb, Eu, Nd, Gd, Th preferably Pd, Pt, Ru, Os, Re, The ligand L can be selected for example, but not limited thereto, from the group of heterocyclic aromatic or non-aromatic systems containing at least one atom which is not carbon, preferably nitrogen or oxygen, by which the ligand is linked to the metal. The said aromatic heterocyclic aromatic or non-aromatic system is a mono- or polycyclic condensed ring system or a system of rings covalently bonded to each other, wherein, optionally, said ring system or rings are substituted with further substituents Z, with Z being one or more moieties which, at each occurrence, is independently selected from H, substituted or non-substituted alkenyl or alkynyl, or halogen, such as Cl, Br, F, I, or $NO_2$, $NH_2$, CN, $SO_3H$, OH, H, $-(CH_2)_nCH_3$, $-(CH_2)_n-COOR$, $-(CH_2)_n-OR$, $-(CH_2)_n-SR$, $-(CH_2)_n-NR_2$, $-((CH_2)_p-O)_n-CH_3$, with R being H, any substituted or non-substituted alkyl, aryl or heteroaryl n being 0-10, preferably 0-6 and p being 0-4, preferably 1-2 or any aromatic and heteroaromatic system, preferably represented by formula x

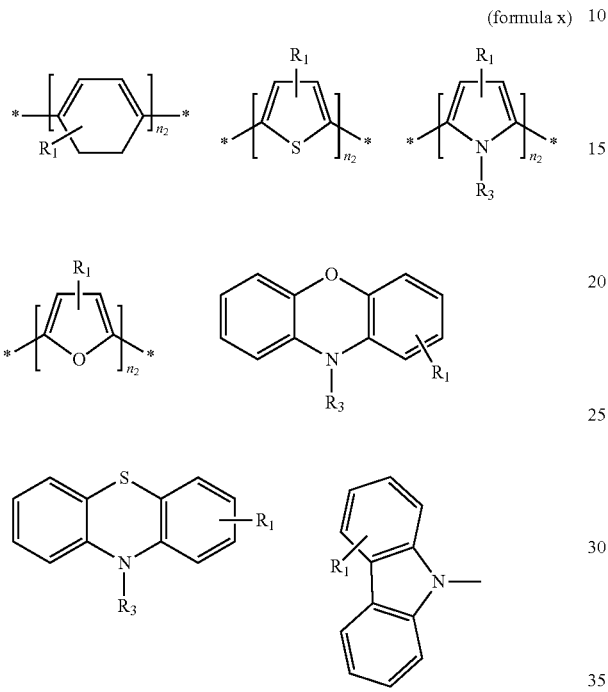

(formula x)

$n_2$ being 1-5

$R_1$ being H, any alkenyl, alkynyl, aryl or halogen, such as Cl, Br, F, I, or $NO_2$, $NH_2$, —CN, —SCN, =$C(CN)_2$, =O, —$SO_3H$, OH, H, —$(CH_2)_nCH_3$, —$(CH_2)_n$—COOR, —$(CH_2)_n$—OR, —$(CH_2)_n$—SR, —$(CH_2)_n$—$NR_2$, —$((CH_2)_p$—$O)_n$—$CH_3$, $R_3$ being H, —$(CH_2)_nCH_3$, —$(CH_2)_n$—COOR, —$(CH_2)_n$—OR, —$(CH_2)_n$—SR, —$(CH_2)_n$—$NR_2$, —$((CH_2)_p$—$O)_n$—$CH_3$, The ligand L can be selected for example, but not limited thereto, from the class of substituted or non-substituted macrocyclic systems of porphyrines including and also extended systems of these derivatives, such as benzoporphyrines or naphthaloporphyrine.

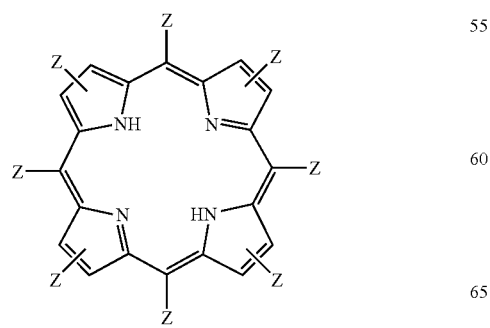

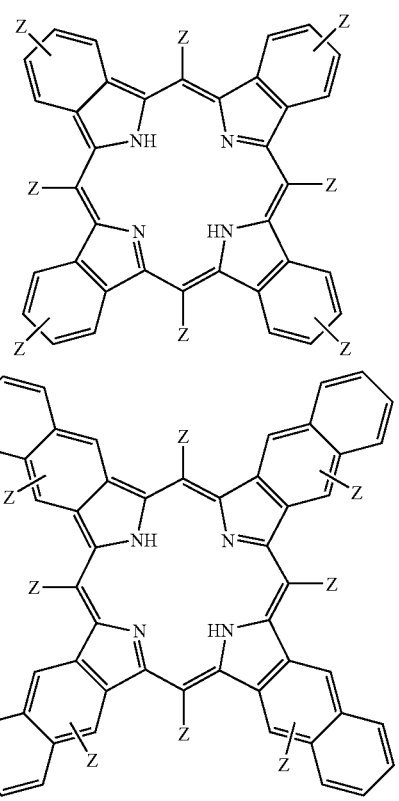

The ligand L can be selected for example, but not limited thereto, from the class substituted or non-substituted macrocyclic systems of tetraazaporphyrine, phthalocyanine or naphthalocyanine.

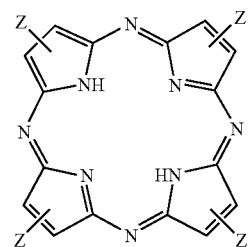

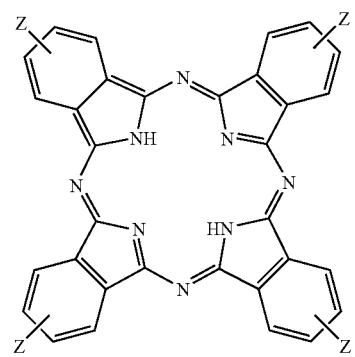

17
-continued

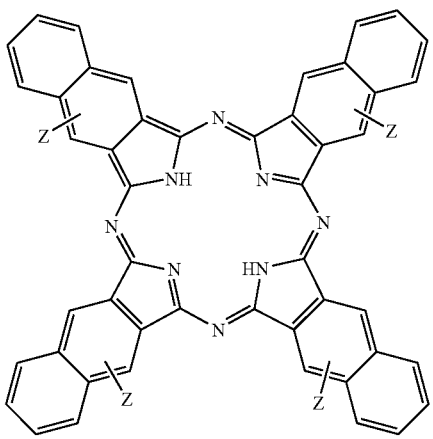

The ligand L can be selected for example, but not limited thereto, from the class of substituted or non-substituted macrocyclic systems of corroles or aza-corroles including their benzo- and naphto-extended systems.

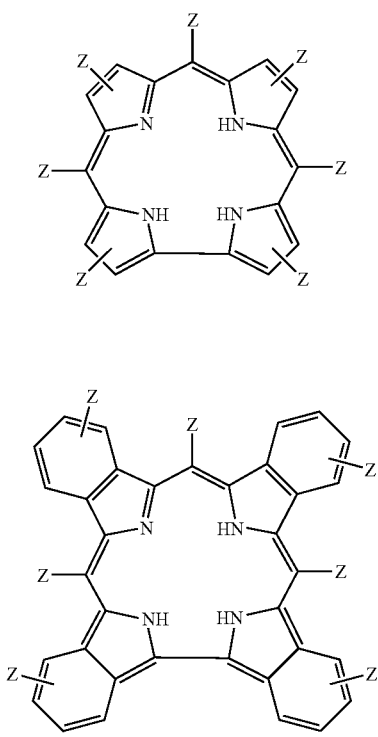

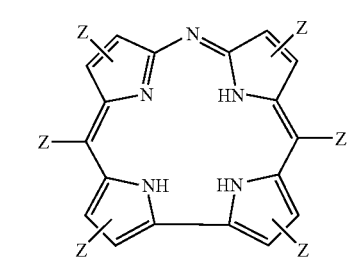

18
-continued

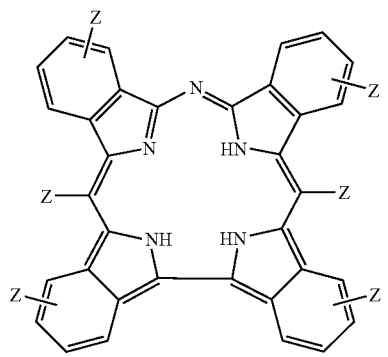

The ligand L can be selected for example, but not limited thereto, from the class of substituted or non-substituted linear tetra-, tri- or dipyrrole systems, including their benzo- and naphto-extended systems

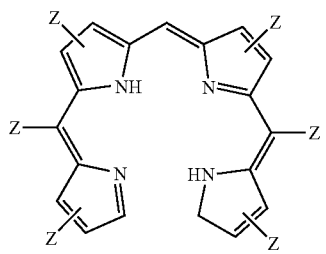

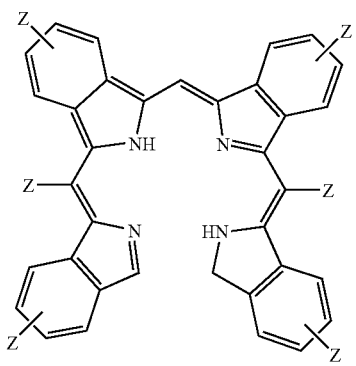

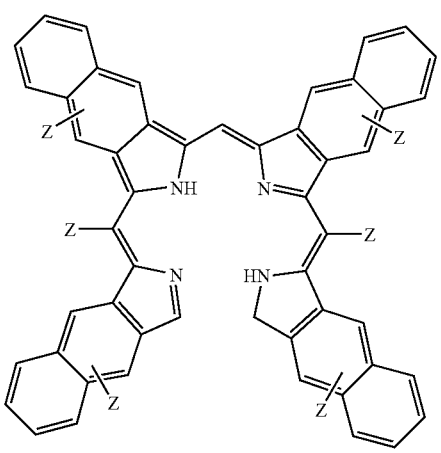

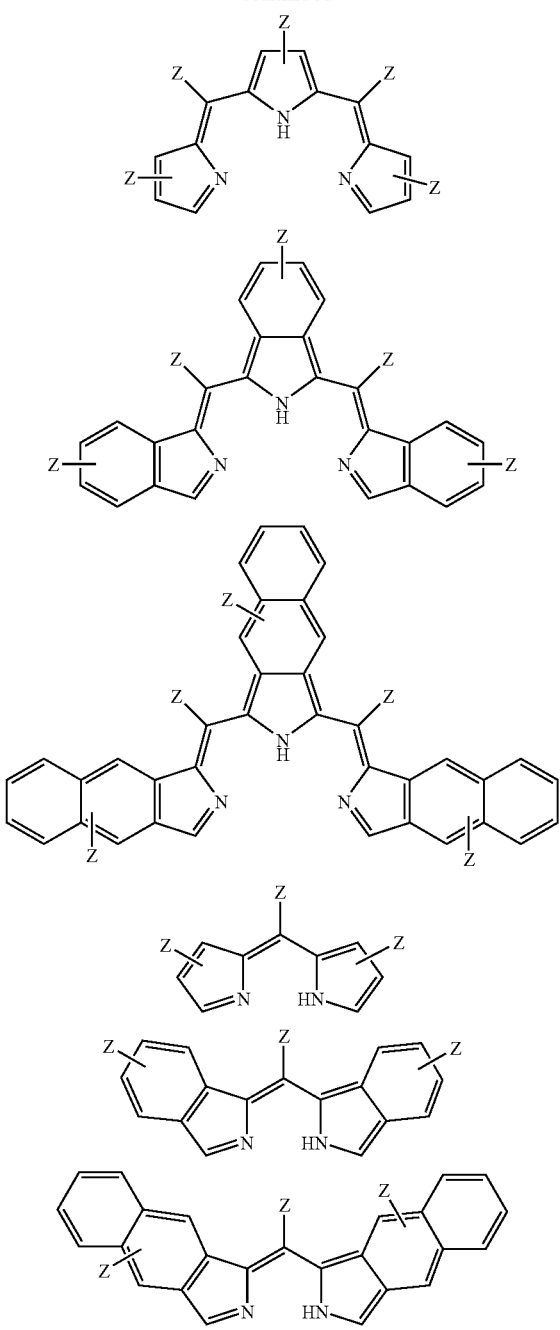

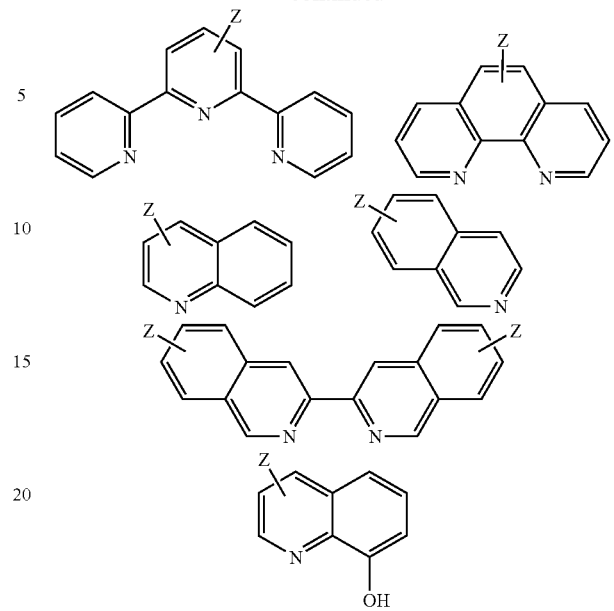

The ligand L can be selected for example, but not limited thereto, from class of substituted or non-substituted heteroaromatics molecules represented by the structures and any combination of the structures

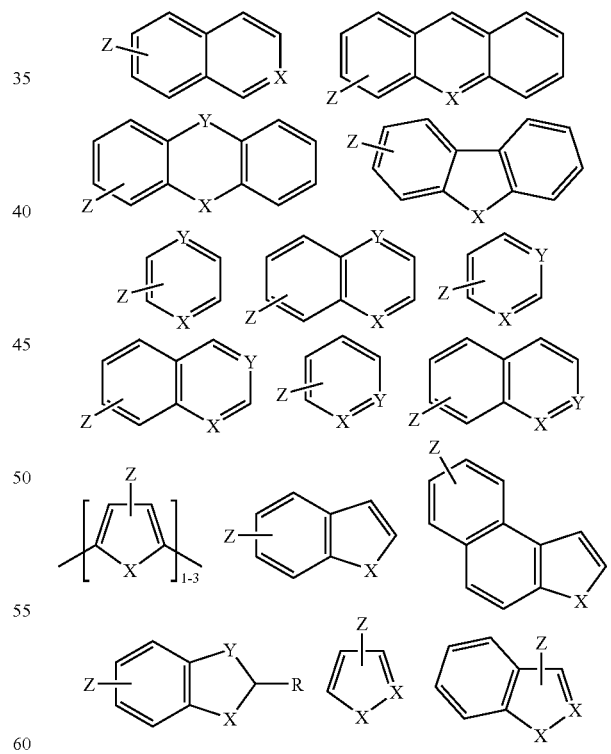

with X and Y being independent from each other NR, O, S

The ligand L can be selected for example, but not limited thereto, from derivatives containing substituted or non-substituted benzene-1,2-diol; benzene-1,2-diamine; ethane-1,2-diamine; ethane-1,2-diol; naphthalene-2,3-diamine; naph- The ligand L can be selected for example, but not limited thereto, from the class of substituted or non-substituted pyridine, bi-, ter- or poly-pyridyls, phenantrolines, quinoline, isoquinoline, bis-isoquinoline, hydroxyquinoline

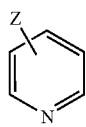 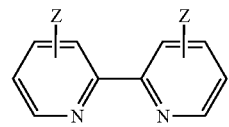

thalene-2,3-diol; anthracene-2,3-diol; anthracene-2,3-diamine; oxalamide, oxalic acid, ethylendiamintetraacetic acid

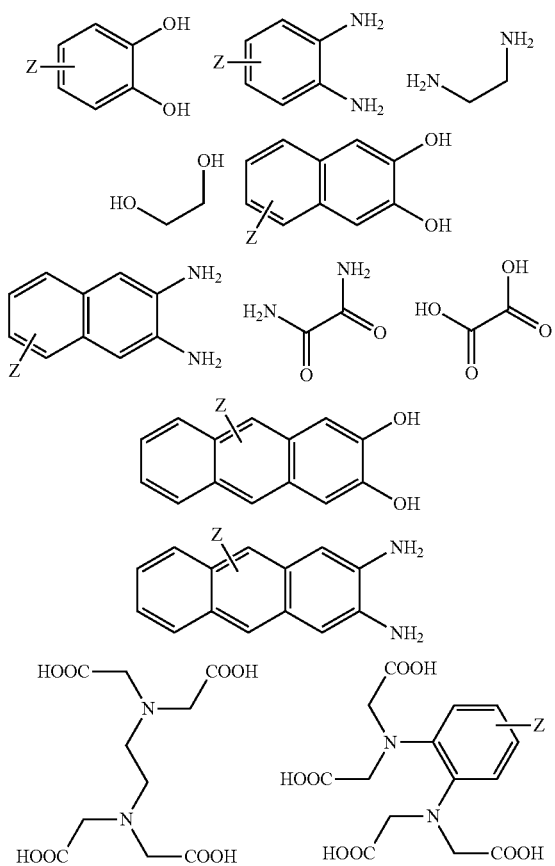

Sensitizers which are organic dyes are selected, but not limited thereto, from the class of substituted or non-substituted coumarins and their derivatives,

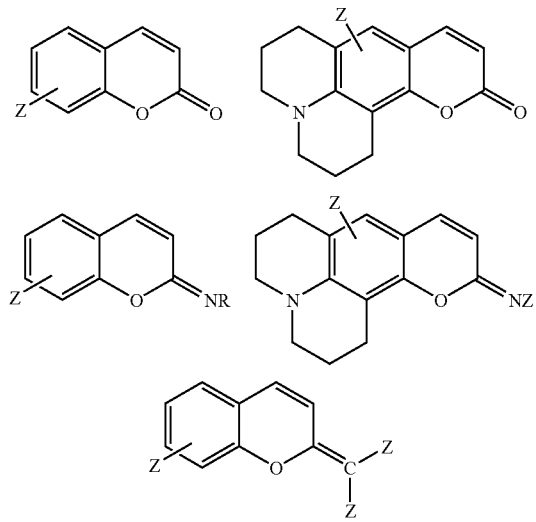

-continued

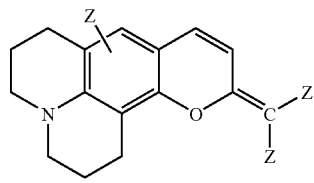

with Z as described above substituted or non-substituted cyanine-, merocyanine-, and azo-dyes and their derivatives,

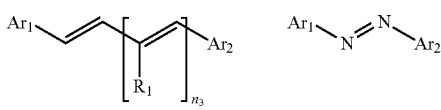

with $n_3$=0-6, preferably 0-3

With $Ar_1$ and $Ar_2$ being same or different, at each occurrence independently selected from

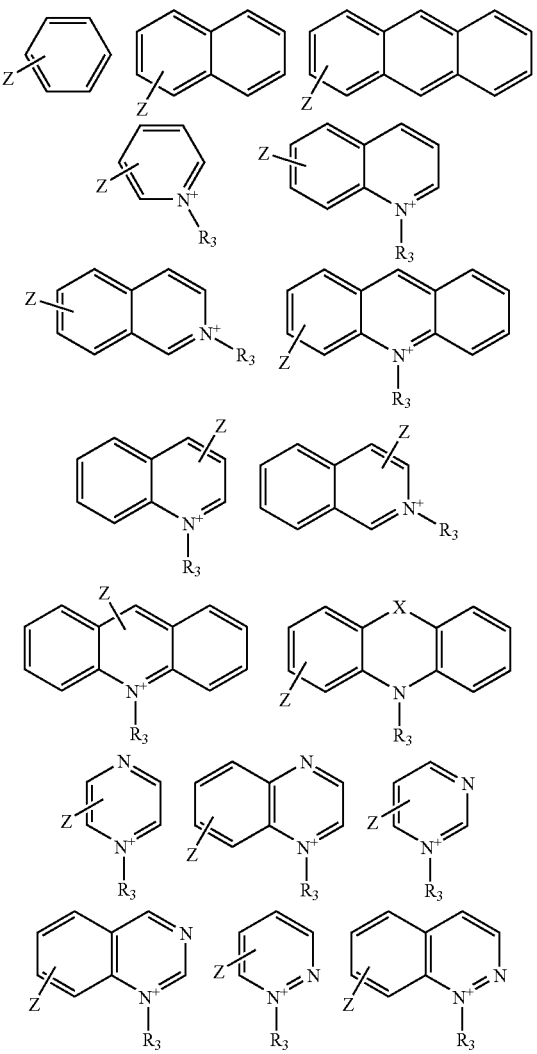

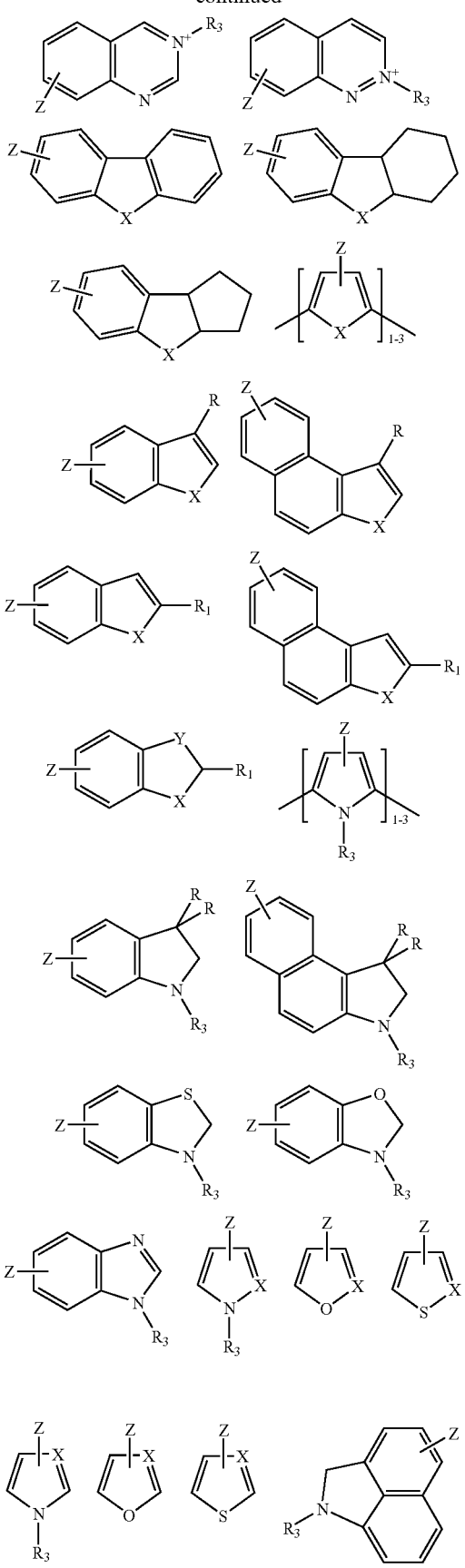

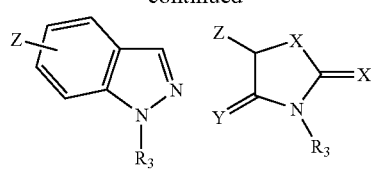

or any combination of these structures with Z, R, and R₃ as defined above substituted or non-substituted derivatives of squarylium and croconium dyes

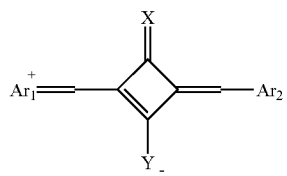

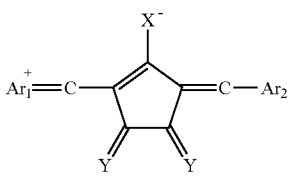

X, Y, Ar₁ and Ar₂ being defined as above, substituted or non-substituted derivatives of semi-squarylium or semi-croconium dyes and their derivatives or

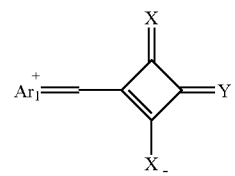

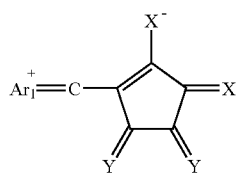

or any aromatic and heteroaromatic systems bridged (poly-)styrene, or other aromatic or heteroaromatic rings, secondary or tertiary amines with aromatic or heteroaromatic systems attached, (poly-)phenylenes mono-endcapped with an aromatic system or metal organic complexes, or substituted and non-substituted derivatives of a) a (poly-)phenylenes mono-endcapped with an aromatic system, or b) a secondary or tertiary amines substituted with aromatic or heteroaromatic unit, or c)-f) aromatic and heteroaromatic systems bridged by (poly-)styrene, or other (poly-)aromatic or heteroaromatic rings, as presented by structures below a) 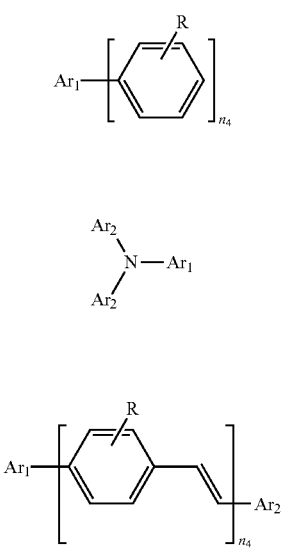

b)

c)

d)

e)

With $n_4$=1-4, preferably 1-2
Ar1, Ar2, X and R as described above.

Organic dye can be also selected from the class of ligands L, such as the class of porphyrine, phtalocyanine, corroles, which are not bound to a metal.

Emitter molecules (or "emissive components") are organic molecules with emitting singlet states (efficient) The emitter molecules can be selected from the group of E.

E can can be selected for example but not limited from the class of substituted or non-substituted anthracenes, naphtacenes, pentacenes, rubrene and their derivatives, the core being expressed by the structures

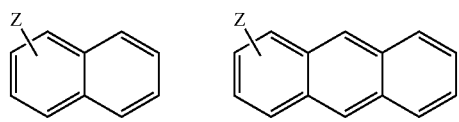

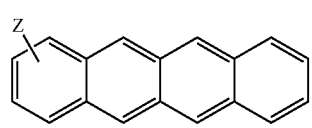

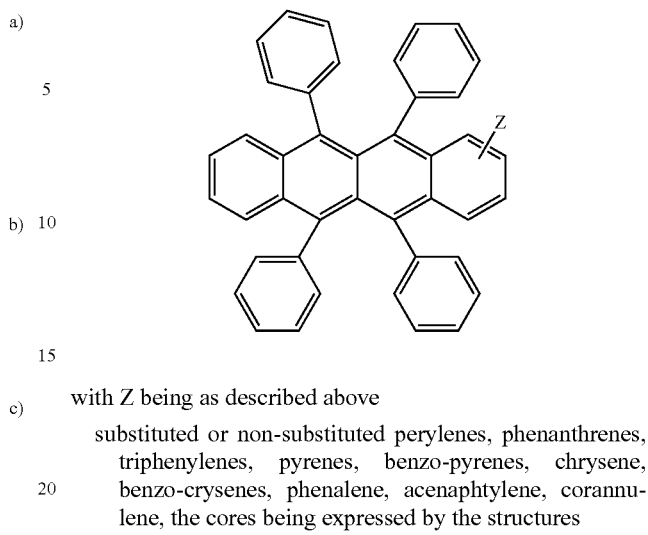

with Z being as described above substituted or non-substituted perylenes, phenanthrenes, triphenylenes, pyrenes, benzo-pyrenes, chrysene, benzo-crysenes, phenalene, acenaphtylene, corannulene, the cores being expressed by the structures

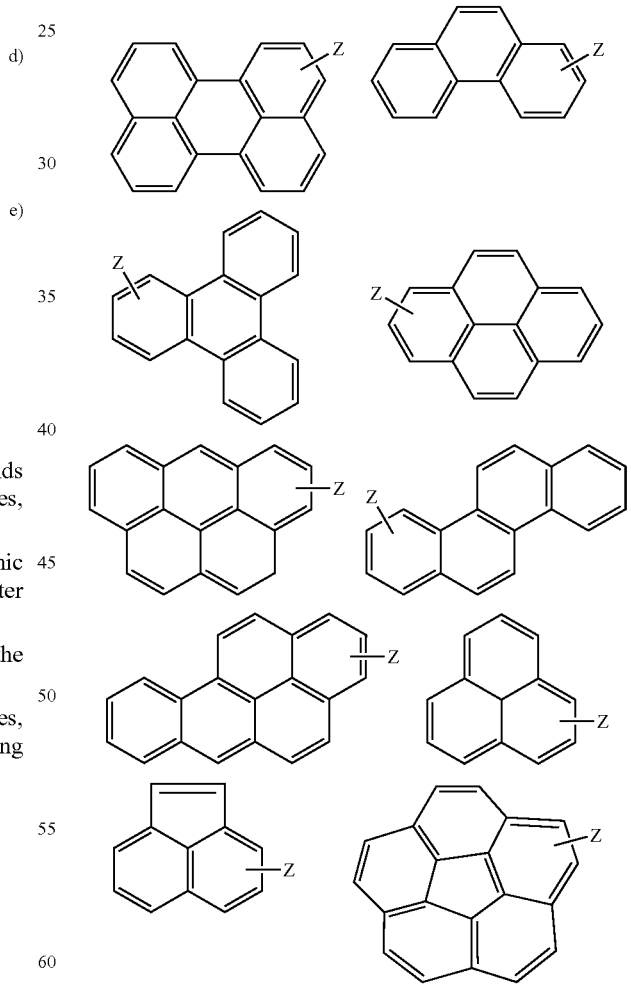

with Z being as described above substituted or non-substituted of derivatives containing non-aromatic, aromatic and heteroaromatic fused systems, the cores being expressed by the structures

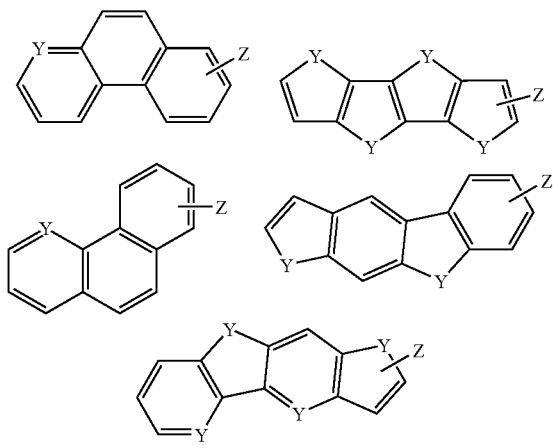

or any combination of these structures
with Z being as described above
with Y being C, Si, N, S, O
substituted or non-substituted of class of (poly)-silole or -pyrrol or thiophene based compounds, the cores being expressed by the structures

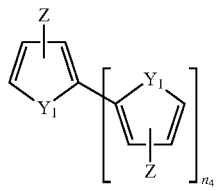

With Z and $n_4$ as described above
And Y1 being $Si(Z)_2$, —N(Z) or S.

The emitter molecules can be also molecules expressed by general formula below

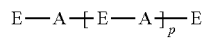

With p being 0 to 20
With E and A as defined above and with Lm, when appearing, at each occurrence in this formula, being an independently selected ligand.

Inert matrix in which sensitizer and emissive component(s) are distributed
Reasonably transparent in the VIS and near-IR region, with defined variable viscosity Examples, but not limited to
Oligomers and co-oligomers—styrenes, methylmetacrylates, phenols, acrylic acid, vinyl alcohol, carbonate, imide, amide, ethylene, ethylene glycols, propylene, propylene glycols, in general olefins and olefin glycols, terephthalic acid, epsilon-caprolactone, and substituted and functionalised styrenes, methylmetacrylates, acrylic acid, vinyl alcohol, carbonate, imide, amide, ethylene, ethylene glycols, propylene, propylene glycols, in general olefins and olefin glycols, and all possible mixtures thereof and with organic solvents or water to vary and control viscosity
Polymers and copolymers (block, alternating and graft copolymers) with molecular weights from $10^3$ to ca. $10^9$:
e.g. but not limited to: polystyrenes, polymethylmetacrylates, in general all polyacrylics, polycarbonates, polyethylenes, polypropylenes, polymethylpentane (in general polyolefins), polyethylene naphtalate, polyethylene therephthalate, polyimides, polyetherimides, polyamides, polyetheretherketones, polyhydroxybutyrates, poly-L-lactic acids, polyepsilon-caprolactone, polyethylene oxides, polypropylene oxides, i.e. polyethylene and polyalkylene glycols, all the mixtures and blends thereof, as well as with organic solvents or water to vary and control viscosity.

Physical and chemical polymer gels:
irradiation crosslinking (all oligomers and polymers described above, but not limited to, as well as their mixture as well with low molecular weight solvents to adjust viscosity
reactive crosslinking (epoxy-resines, etc.)

All of the organic systems of the prior art reported above are solution based. Hence their application in devices is difficult and requires sealed compartments. The present inventors have devised media for photon energy up-conversion which are based on organic sensitizers and emitters and which comprise a matrix that allows the deposition of such media as a film over extended areas In particular, in some embodiments of the invention, a "sensitizer" is a non-linear absorber which means that it shows absorption characteristics which do not show linear behavior, in particular with light at high incident irradiation. Where the absorption is the result of a direct two-photon-excitation process, the sensitizer has to have a high enough TPA cross-section. In the case where there is a sequential two-multi-photon excitation, whereby the sensitizer becomes an optical limiting compound, in most cases it is a reverse saturable absorber (RSA). These systems are defined as having an absorption in the excited state (singlet or triplet) higher than the absorption of the ground state. Their absorption scheme is usually described in a five- or six-level model, which is shown in FIG. 1. In this figure, S0 is the ground singlet state, S1, Sx, Sn—the excited singlet states, T1 and Tn are the triplet states. The performance of these compounds is characterized by the ratio of the excited state—to the ground-state-absorption (including singlet and triplet levels) and by the saturation intensity or fluence. For a good performance (i.e. for a good up-conversion behavior) the ratio of the excited-state-absorption to ground-state-absorption is large, whereas the saturation intensity or—fluence is low.

The "emitter" component (i.e. the second component) ought to have an emissively relaxing excited energy level at a position to which the excitation energy transfer can take place from any of the high excited states (i.e. singlet Sn or triplet Sn) of the sensitizer component. Furthermore a higher fluorescence quantum efficiency of the emitter component is important and preferred.

By the present invention a greater versatility is achieved in that the possibility to combine the properties of at least two independently active compounds, a new system/composition is created having a variety of properties which are not shown by each component, when on its own. The use of a matrix which is a solid, a gel or a fluid with viscosity equal or higher than $0.59 \times 10^{-3}$ Pa·s allows to form films of such media or other desired shapes which makes these media particularly versatile for a number of applications and obviates the need for specific measures to avoid leakage. For example, the absorbing molecules, i.e. "sensitizer" molecules can be varied, whereby the lower energy wavelengths to be up-converted can be varied. Alternatively or in addition thereto, the emissive molecule can be varied thereby allowing a variation of the higher energy wavelengths of the up-converted emission. In using at least one organic compound, either as sensitizer or as emitter, or by using organic compounds for both, it is also possible to make use of the good film-forming properties of organic compounds thereby making the compositions according to the present invention particularly amenable for large-area opto-electronic devices.

EXAMPLES

In the following, reference is now made to the figures which are given as examples wherein:

FIG. 1A shows a schematic scheme of one embodiment of a display system in accordance with the present invention, wherein a light source provides excitation light to a scanner which is a control device for controlling the distribution and, optionally, the modulation of the excitation light to be directed at the medium for photon energy up-conversion; both, the light source and the control device, are computer-controlled and, optionally, driven by respective drivers; and FIG. 1B is a schematic drawing of a similar embodiment.
In this FIG. 1A,
1: "Scanner" is a symbolic description for excitation light distribution and modulation control device and can be one of the following but is not limited to:
1.1. Acousto-Optic Modulator (1D, 2D or 3D)
1.2. Galvanic scanned mirrors (1D, 2D or 3D)
1.3. Opto-mechanic scanned mirrors or rotating polygon prism (1D, 2D or 3D)
1.4. Piezo-scanned mirrors, the excitation beam is scanned (1D, 2D or 3D)
1.5. Piezo-scanned up-conversion screen (1D, 2D or 3D)
1.6. Waveguide (multi-waveguide) structure (see ref. 5)
1.7. Light-field modulation through masks (1D, 2D or 3D)—e.g. holograms, amplitude masks and/or phase masks
2: Light Source
2.1. Laser (any type of, including so called eye-safe lasers)
2.2. Light Emitting Diode (LED)—any type of
2.3. Organic Light Emitting Diode (OLED)—any type of
2.4. Sun-Light (collimated and/or coupled into an optical fibre)
2.5. In general as in ref. 6—"source of electromagnetic radiation"
Viewing Angle
6.1. The screen is transparent—non-limited angles are possible
6.2. Simultaneous observation from many view-points
7: Excitation Angle
7.1. The screen is transparent—non-limited angles are possible
7.2. More than one excitation source (with variable wavelengths)—multi-colour picture
7.3. One or more than one excitation source with the same wavelength—with multilayer structure (each layer with corresponding emitter/sensitizer couple—RGB display with more than one sensitizer/emitter couples—variable colour/white display FIG. 2A shows an embodiment of a display system in accordance with the present invention, wherein a gel-like film (PS (polystyrene) ca. 400 Da matrix) between two polycarbonate-substrates (size 2,5×2,5 cm) is used; this display is based on PdTPTBP and perylene, wherein excitation is provided at 635 nm.

The sensitizer-emitter couple is Perylene/PdTPTBP (Dibenz[de,kl]anthracene (Perylene)/meso-Tetraphenyl-tetrabenzoporphyrin Palladium (PdTPTBP)).

FIG. 2B shows the upconverted emission spectrum when the excitation is realized with different intensities of 635 nm.

The samples are made and sealed in a glove box, the inactive matrix is polystyrene with $M_w$=400 Da, sample thickness ~120 μm, polycarbonate substrates. Scanner: 2-dimensional galvanic scanner, scanning frequency 8 kHz, both lasers—single mode diode laser, temperature stabilized with mode distribution nearly $TEM_{00}$. Laser power ~10 m W.

The excitation wavelength used is (□□635 nm), as a result of which, the emission emission maximum at □□450 nm—is blue, see spectrum in FIG. 2B FIG. 2C shows another embodiment of a display system in accordance with the present invention based on a PS 400 Da (polystyrene) matrix, concentrations sensitizer-emitter as in FIG. 1B: between two glass substrates, sealed, size 5×5 cm. System 9,10-Bis(phenylethynyl)anthracene (BPEA)/meso-Tetraphenyl-tetrabenzoporphyrin Palladium (PdTPTBP): Excitation wavelength □□635 nm, first emission maximum of the emitter □□485 nm. Scanner: 2-dimensional galvanic scanner, scanning frequency 10 kHz single mode diode laser, temperature stabilized with mode distribution nearly $TEM_{00}$, laser power ~5 m W.

FIG. 3 shows another embodiment of a display system in accordance with the present invention based on a PS 400 Da, concentrations sensitizer-emitter as in FIG. 1B: between two glass substrates, sealed, size 2,5×2,5 cm.

System BPBT/PdTPTNP the excitation wavelength used □□695 nm, as the emission on the emission maximum is at □□500 nm 4,4'-bis(5-tetracenyl)-1,1'-biphenylene (BPBT)/meso-Tetraphenyl-octamethoxide-tetranaphtho[2,3]porphyrin Palladium (PdTPTNP).

Scanner: 2-dimensional galvanic scanner, scanning frequency 12 kHz single mode diode laser, temperature stabilized with mode distribution nearly $TEM_{00}$, laser power ~5 mW.

In all the embodiments the displays are prepared and sealed in glove-box with Ar atmosphere.

More specifically, FIG. 1A shows a general scheme of one embodiment of a display system in accordance with the present invention. Light is provided from a light source, which may be a laser, an LED, an OLED, sunlight which may be collimated and/or coupled into an optical fiber directed at the photon energy up-conversion medium. The light is directed at the plane shown in the figure via a control device, herein referred to as a "scanner", which is a device for controlling the light distribution and modulation. Examples of such a control device are an acousto-optic modulator (one-dimensional, two-dimensional or three-dimensional), galvanic scanned mirrors (one-dimensional, two-dimensional or three-dimensional), opto-mechanic scanned mirrors or rotating polygon prism (one-dimensional, two-dimensional or three-dimensional), piezo-scanned mirrors, with the excitation beam being scanned (one-dimensional, two-dimensional or three-dimensional), a piezo-scanned up-conversion screen (one-dimensional, two-dimensional or three-dimensional), a waveguide structure, such as a multi-waveguide structure), or an arrangement of masks, such as amplitude masks and/or phase masks or holograms for light-field modulation (one-dimensional, two-dimensional or three-dimensional). With respect to the viewing angle, the substrate of the display system in accordance with the present invention is transparent, as a result of which any viewing angle is possible, and a simultaneous observation from many view-points may be achieved. With respect to the excitation angle, again, since the substrate(s) is (are) transparent, any angle for excitation is possible, and hence, more than one excitation source with different wavelengths may be used. As a result thereof, a multi-color picture may be achieved. Alternatively, one or more than one excitation source with the same wavelength may be used, in combination with a multilayer structure wherein, within each layer, a corresponding emitter/sensitizer component pair is present. The resulting display may, for example, be an RGB display, or it may be a variable color display or a white display.

Figure 1A:
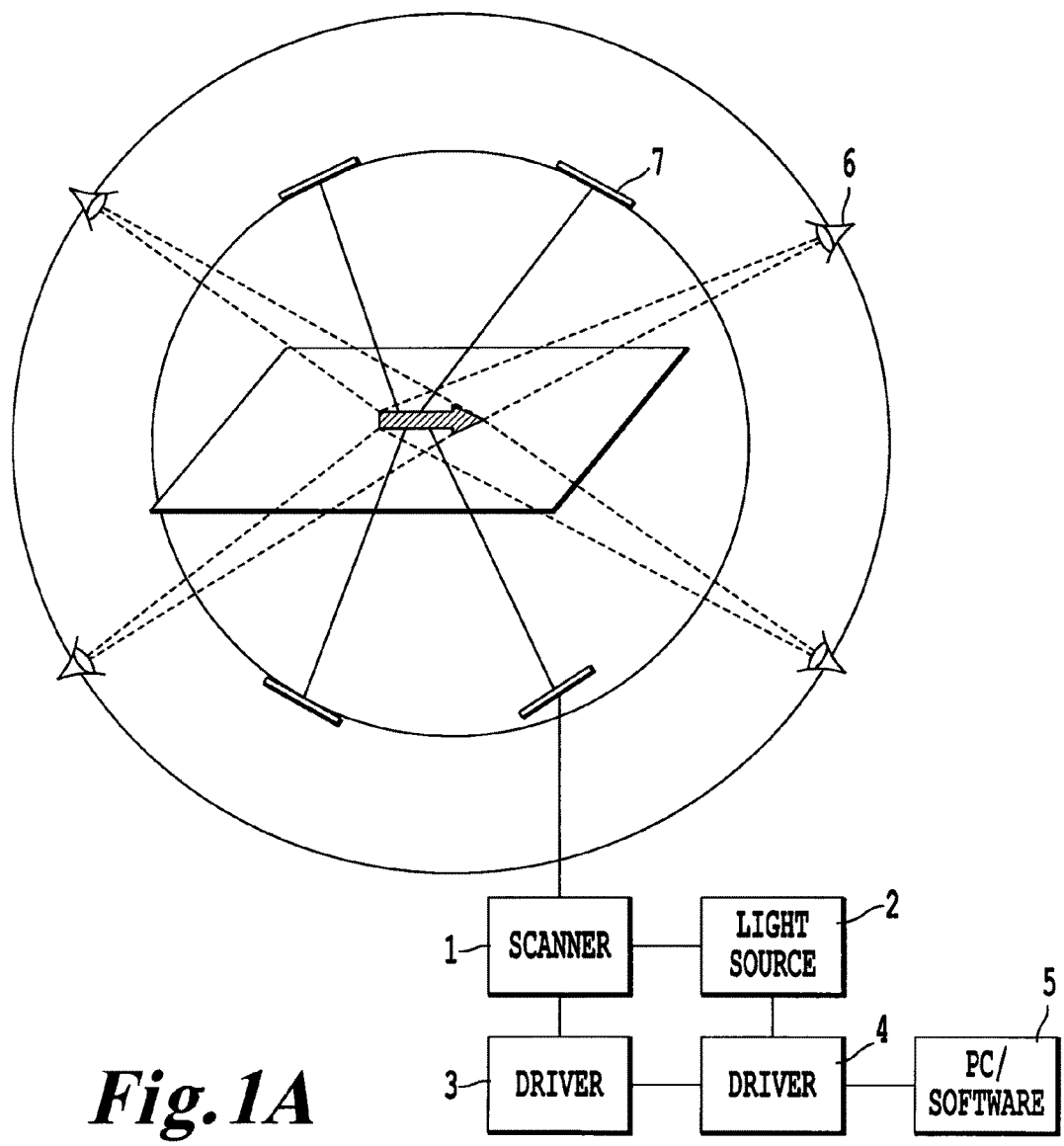
Figure 1B:
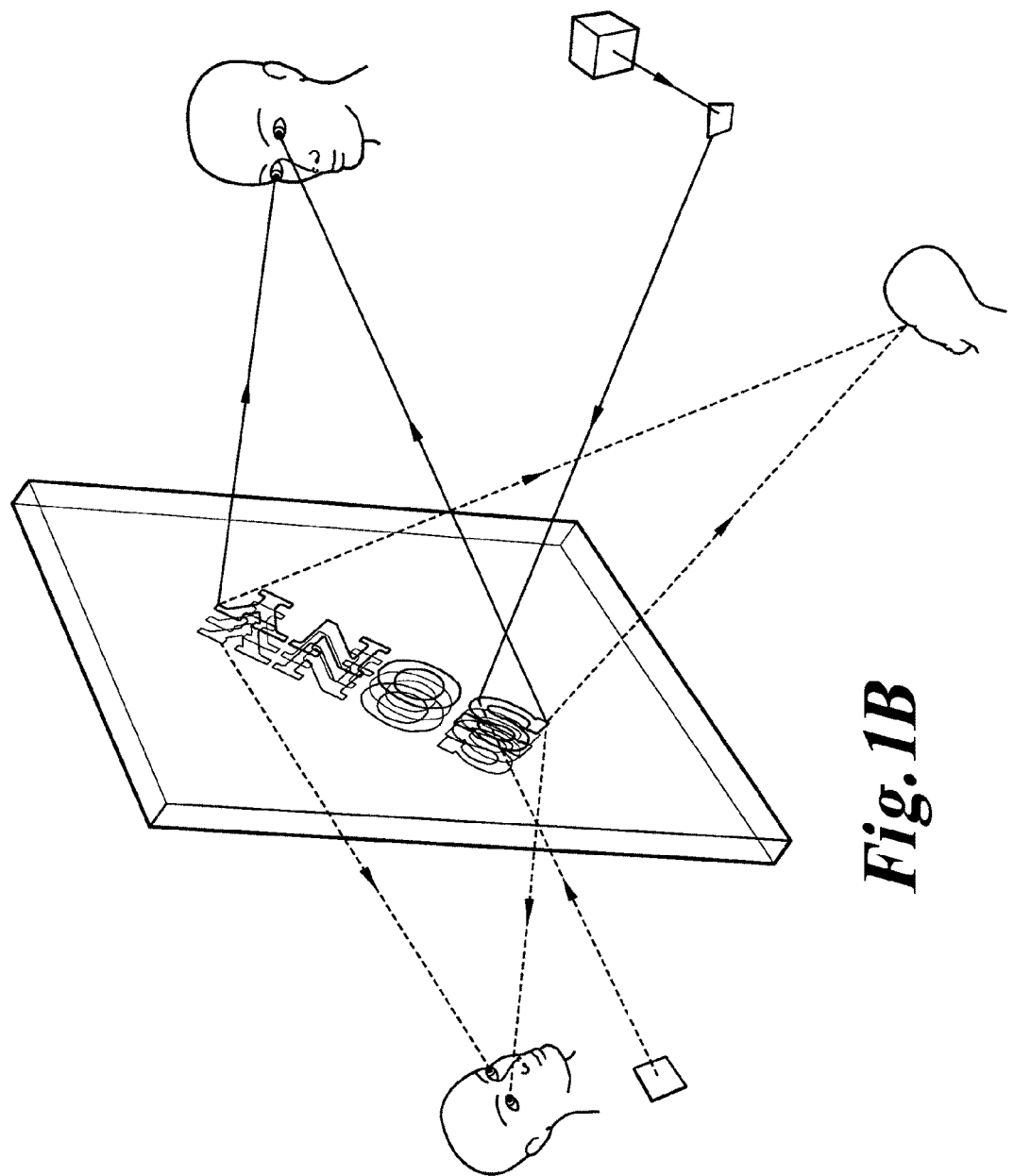
Figure 2A:
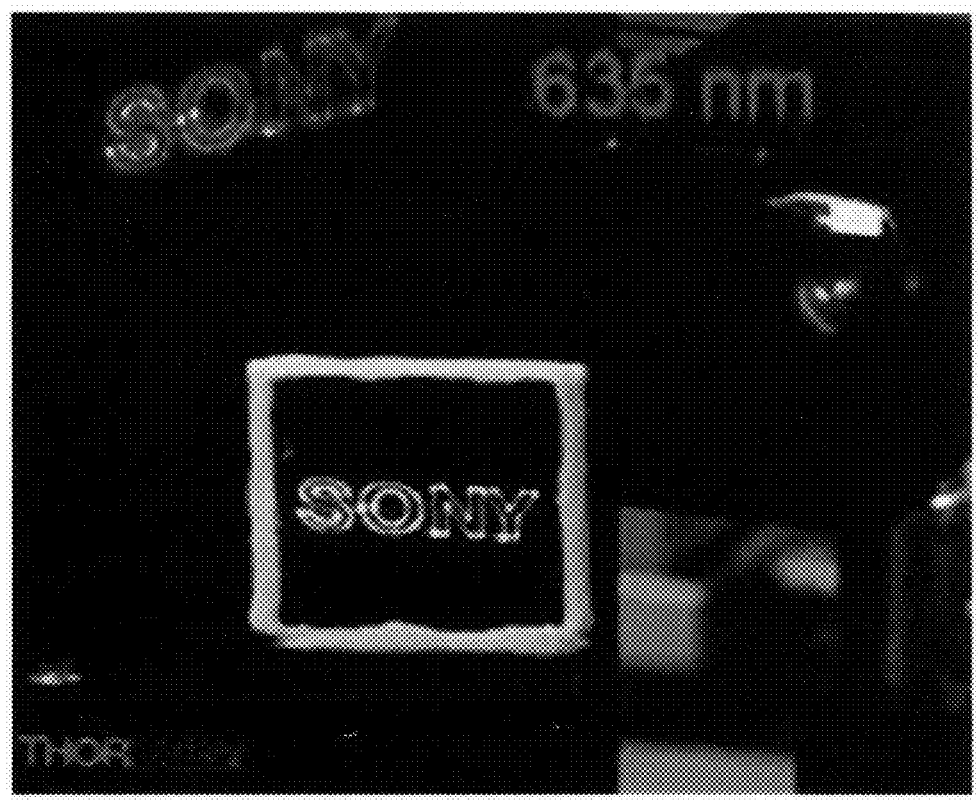
FIGS. 2 and 3 show various examples of display systems based on combinations ("couples") of PdTPTBP and perylene, BPEA and PdTPTBP, BPBT and PdTPTNP.
Figure 2B:
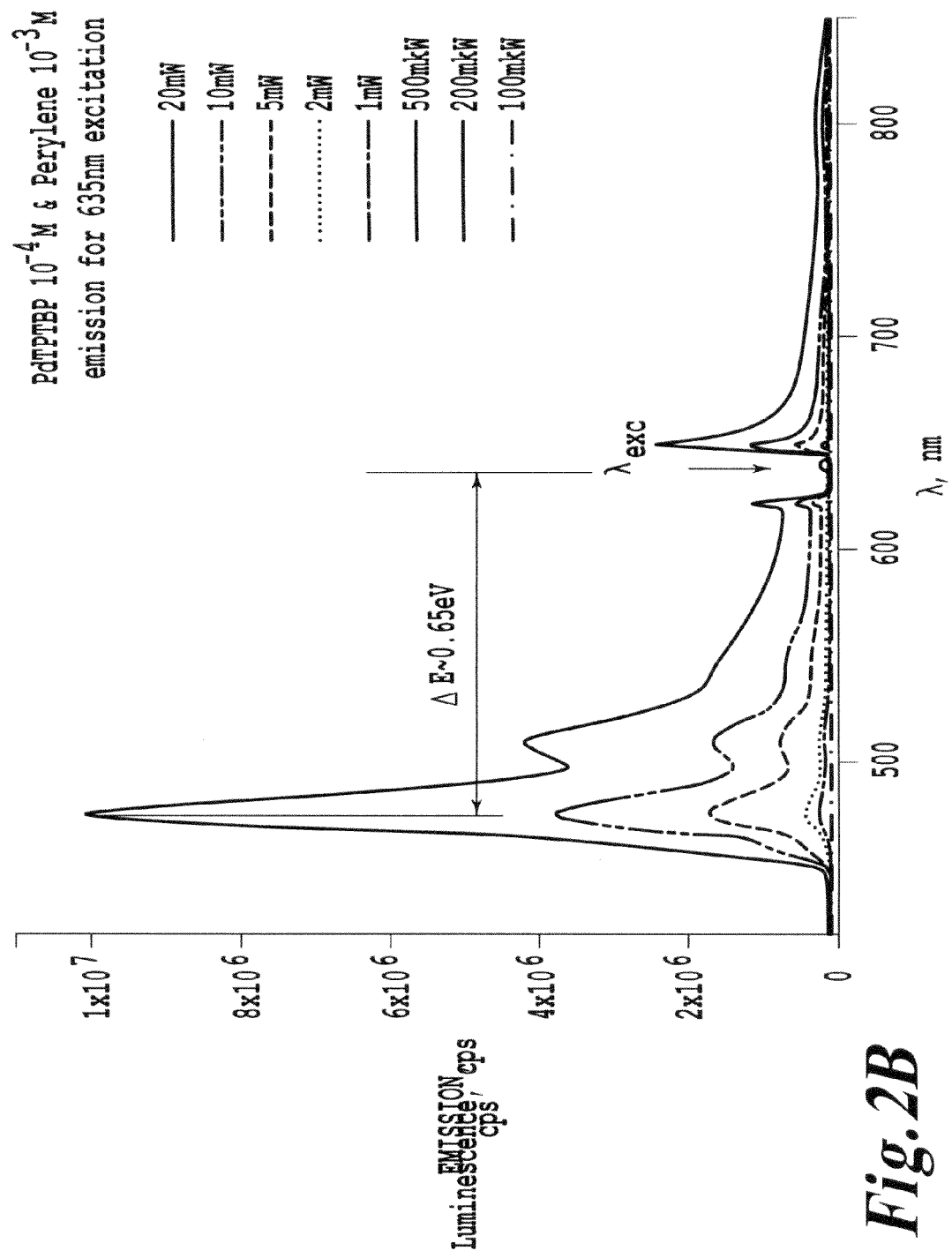
Figure 2C:
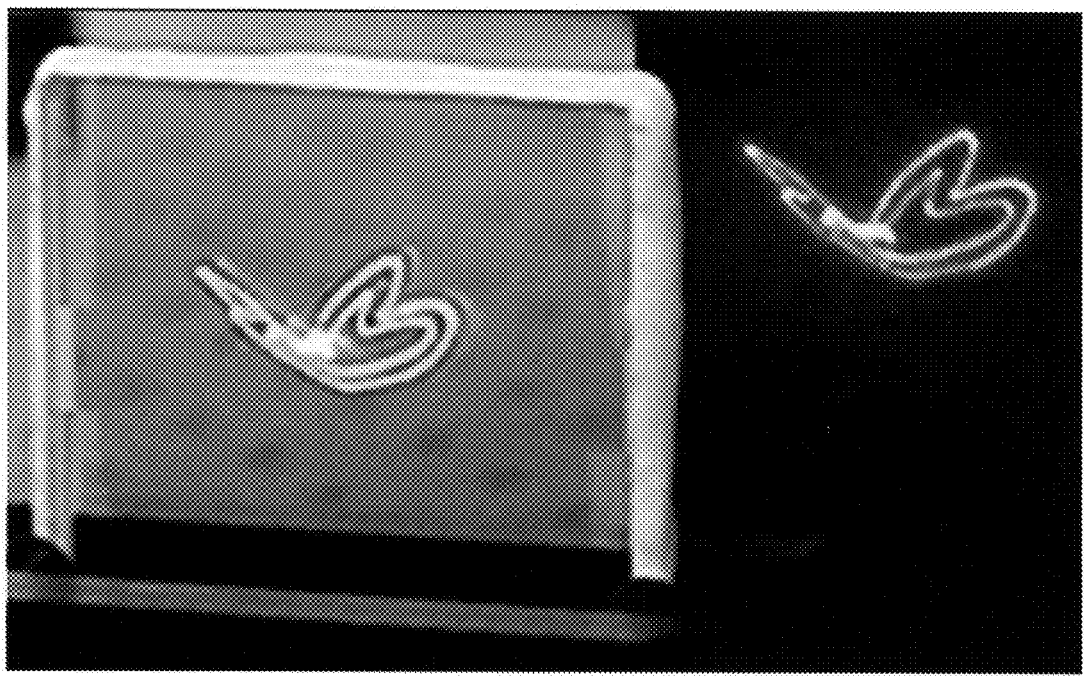
Figure 3:
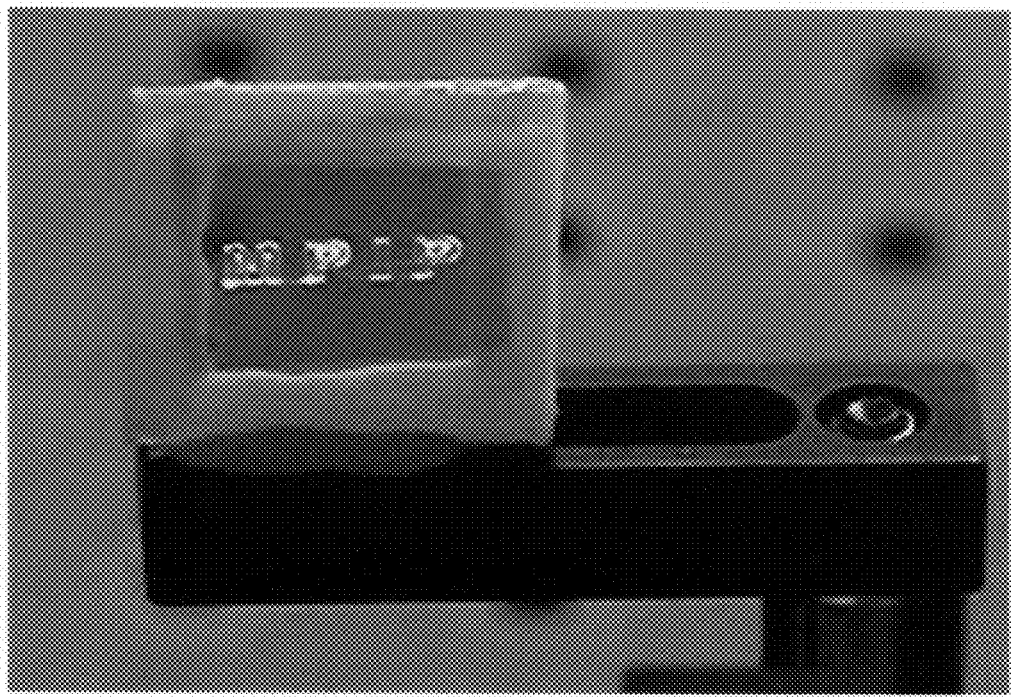
Figure 4B:
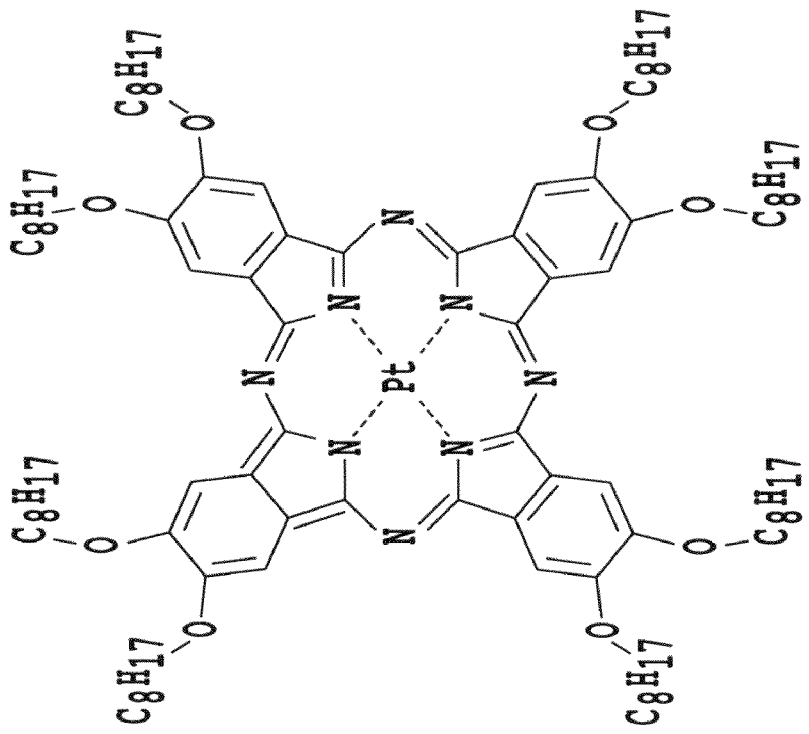
FIG. 4 shows examples of sensitizers, namely
a) Palladium(II) 2,3,9,10,16,17,23,24-Octakis(octyloxy)-phthalocyanine (DOPdPc)
b) Platinum(II) 2,3,9,10,16,17,23,24-Octakis(octyloxy)-phthalocyanine
c) Palladium(II) 2,11,20,29-Tetra-tert-butyl-2,3-naphthalocyanine
d) Palladium(II) 1,8,15,22-Tetraphenoxy-phthalocyanine (PhPdPc)
Figure 4A:
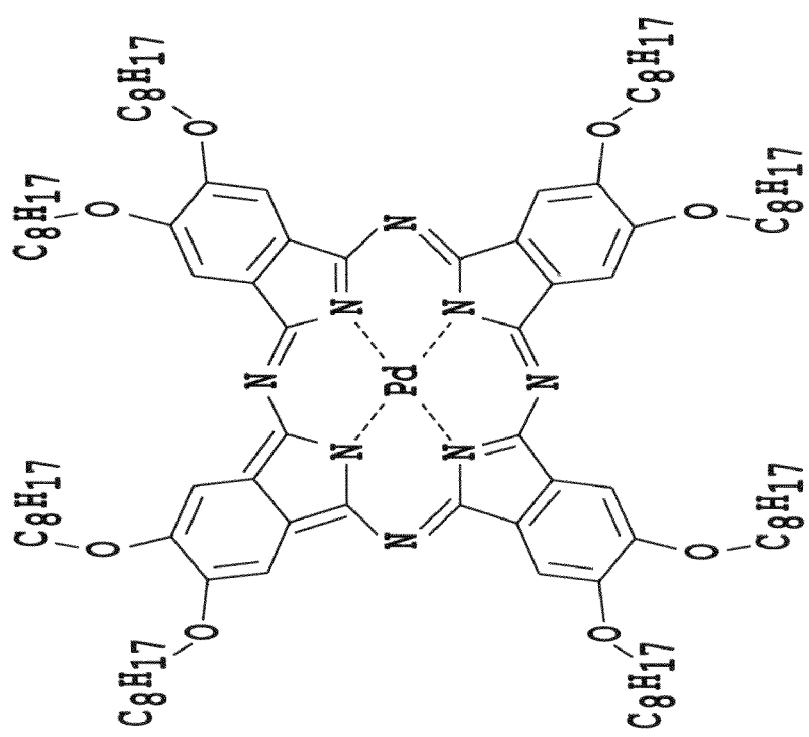
Figure 4D:
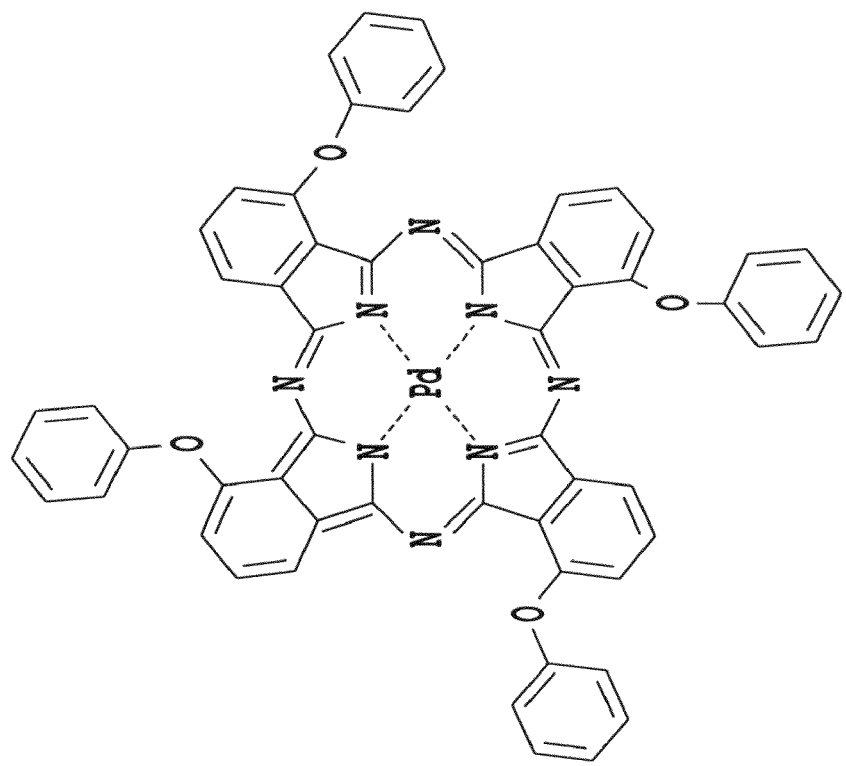
Figure 4C:
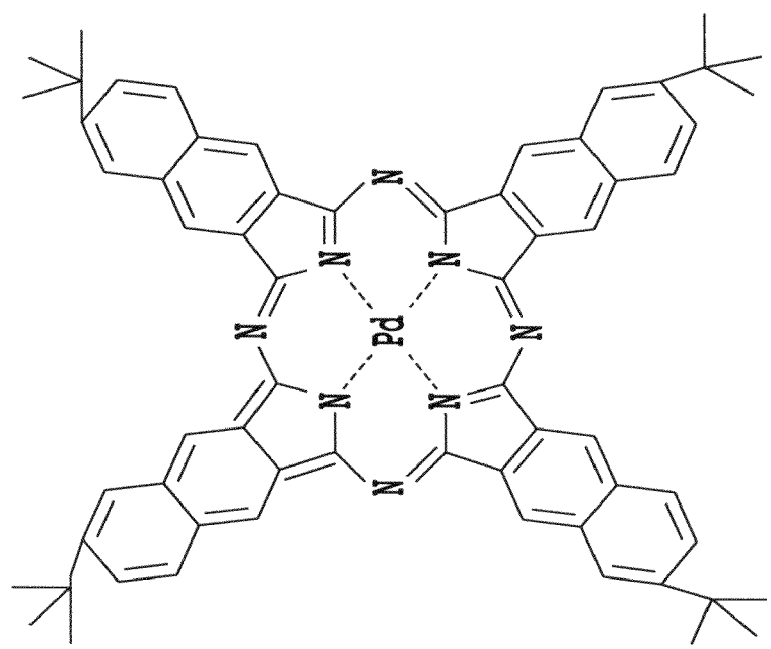
Figure 5A:
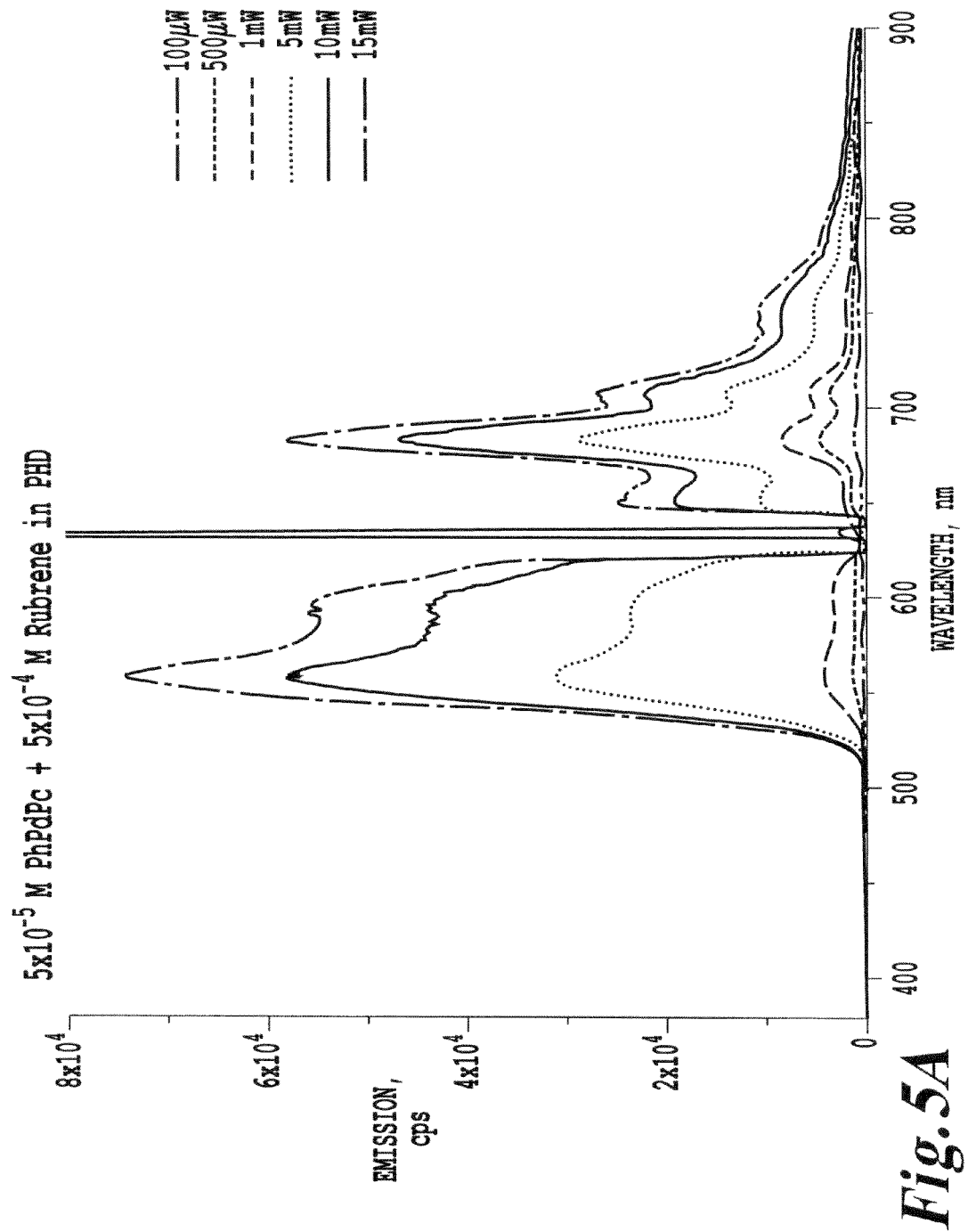
Figure 5B:
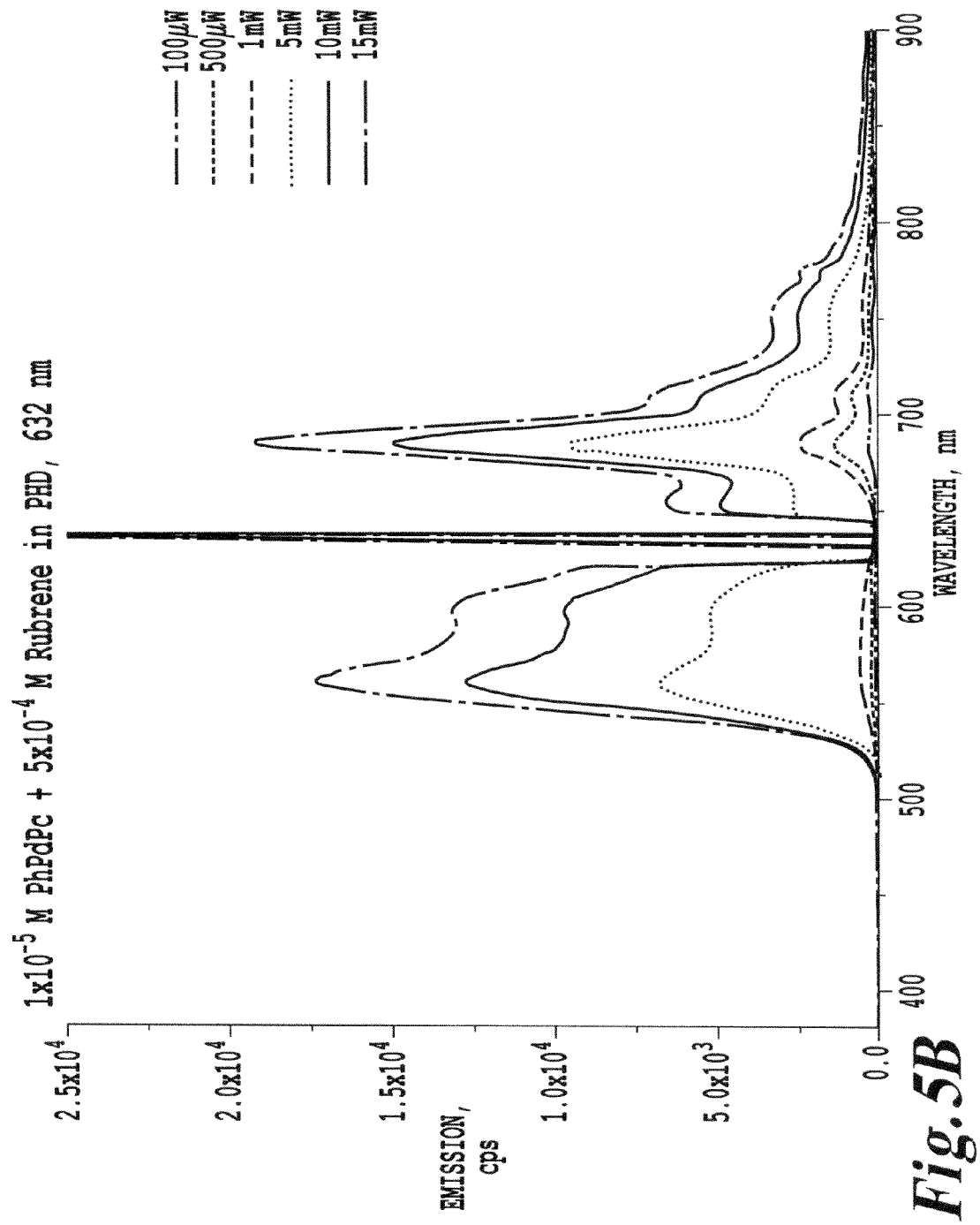
Figure 5C:
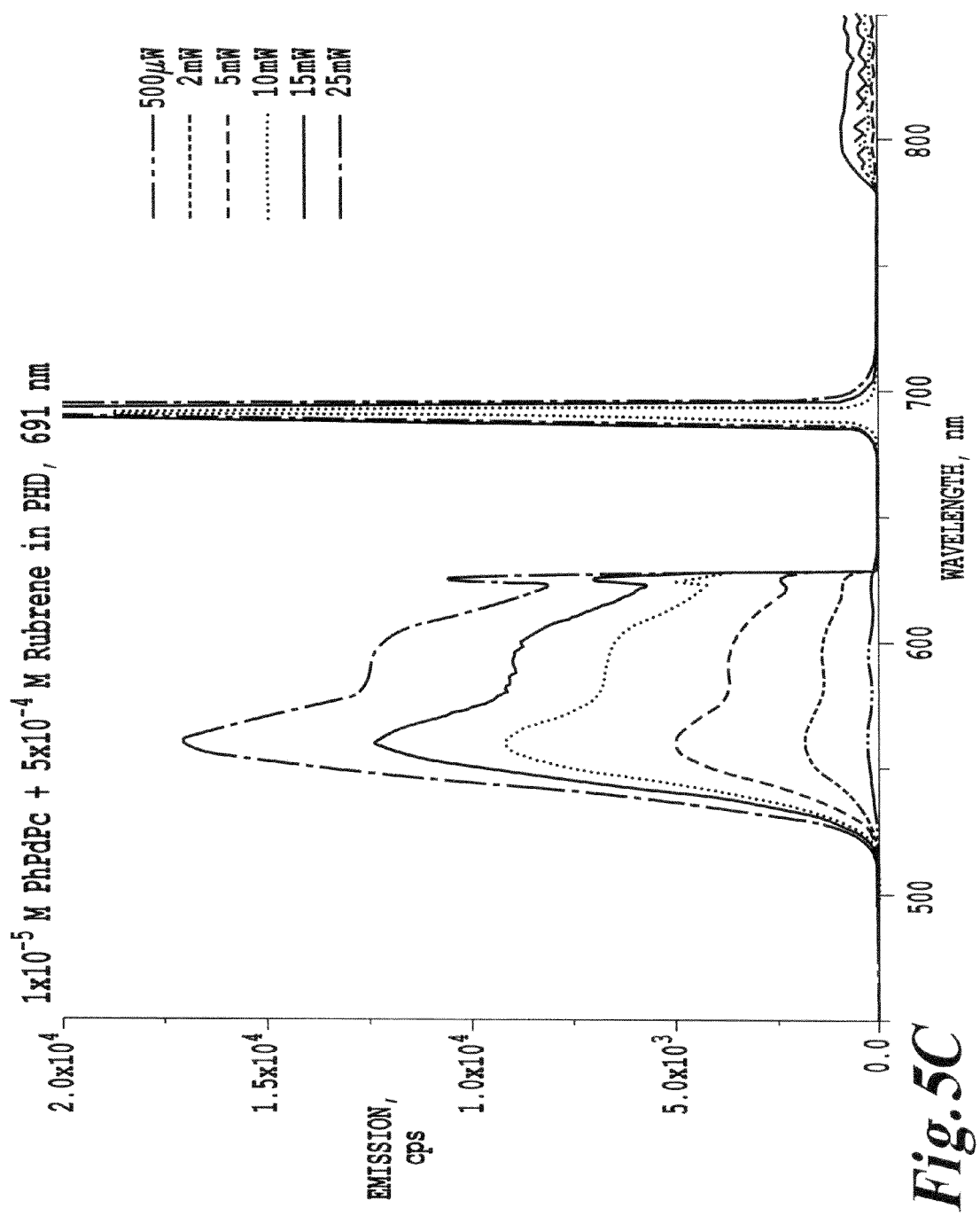
Figure 6:
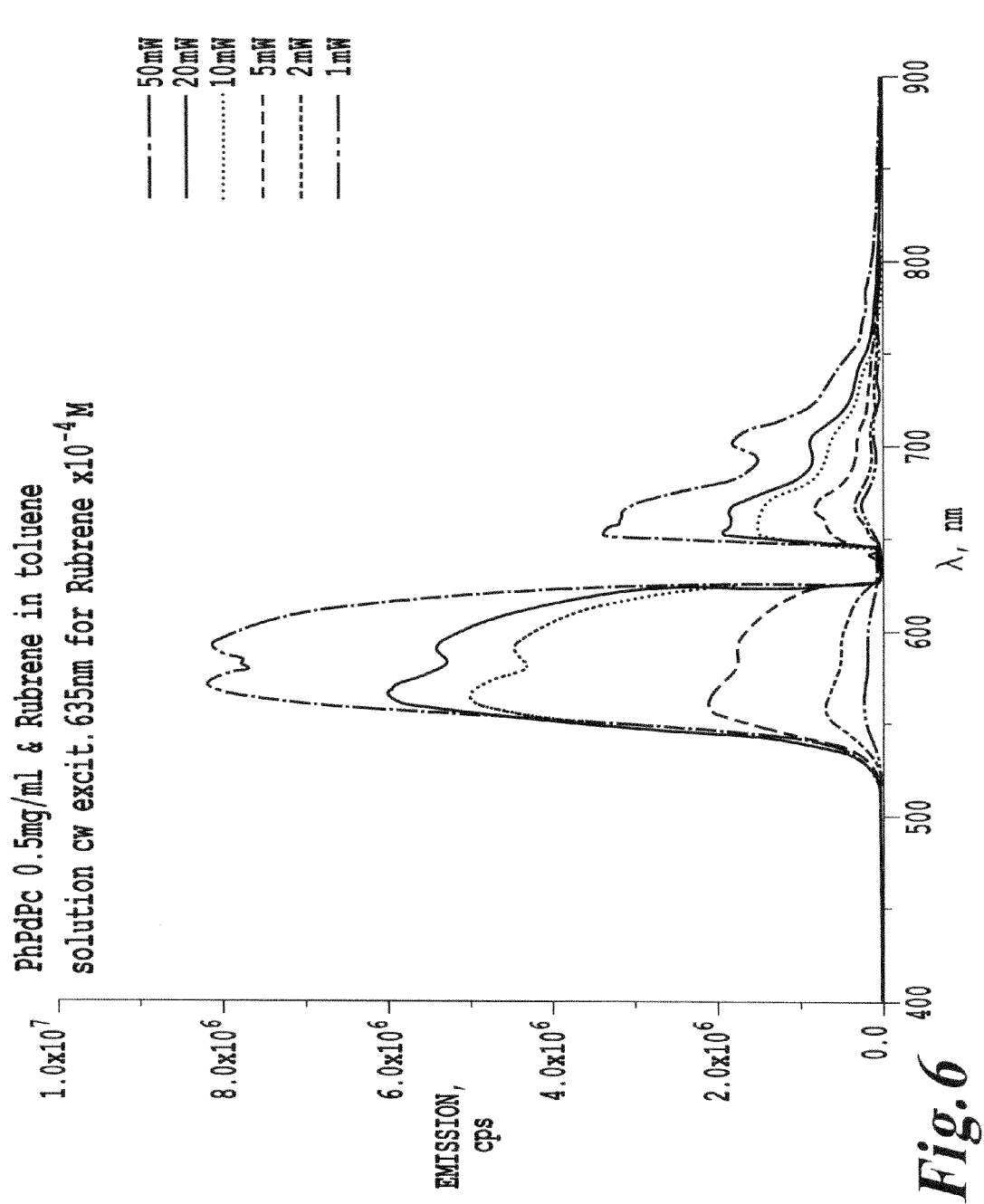
Figure 7A:
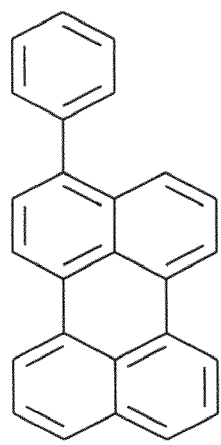
Figure 7B:
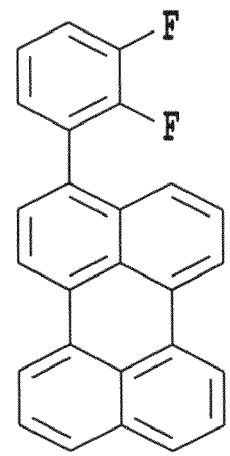
Figure 7C:
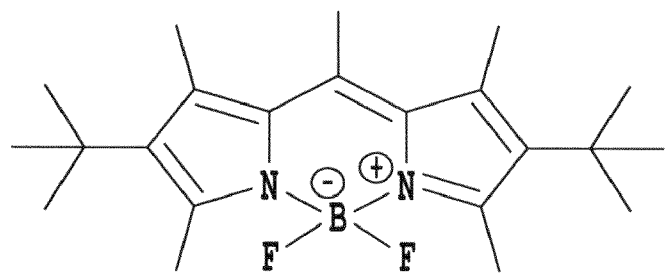
Figure 7D:
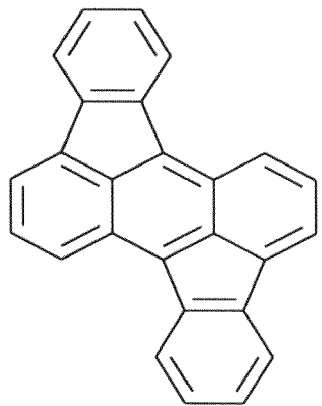
Figure 8:
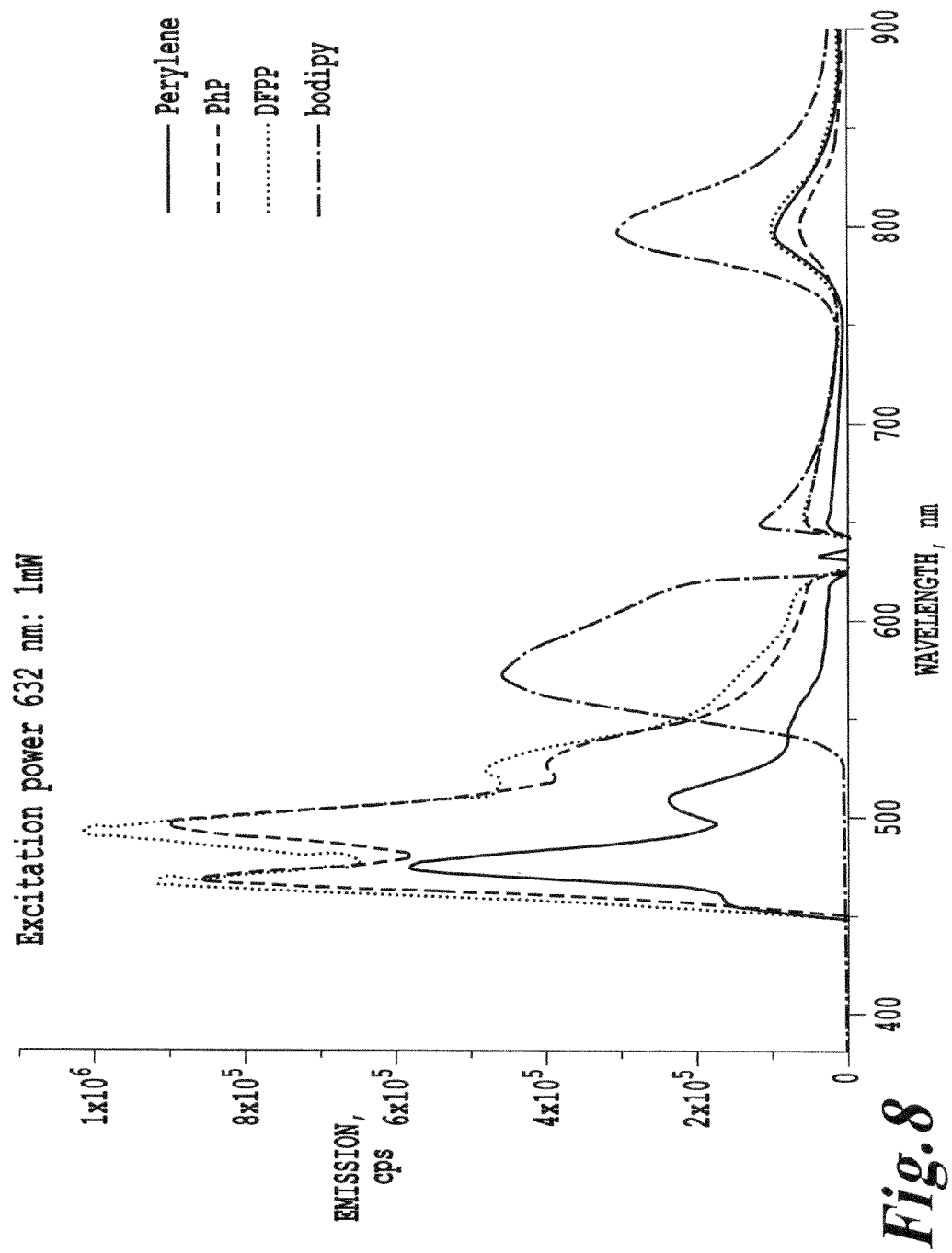
Figure 9:
Figure 10:
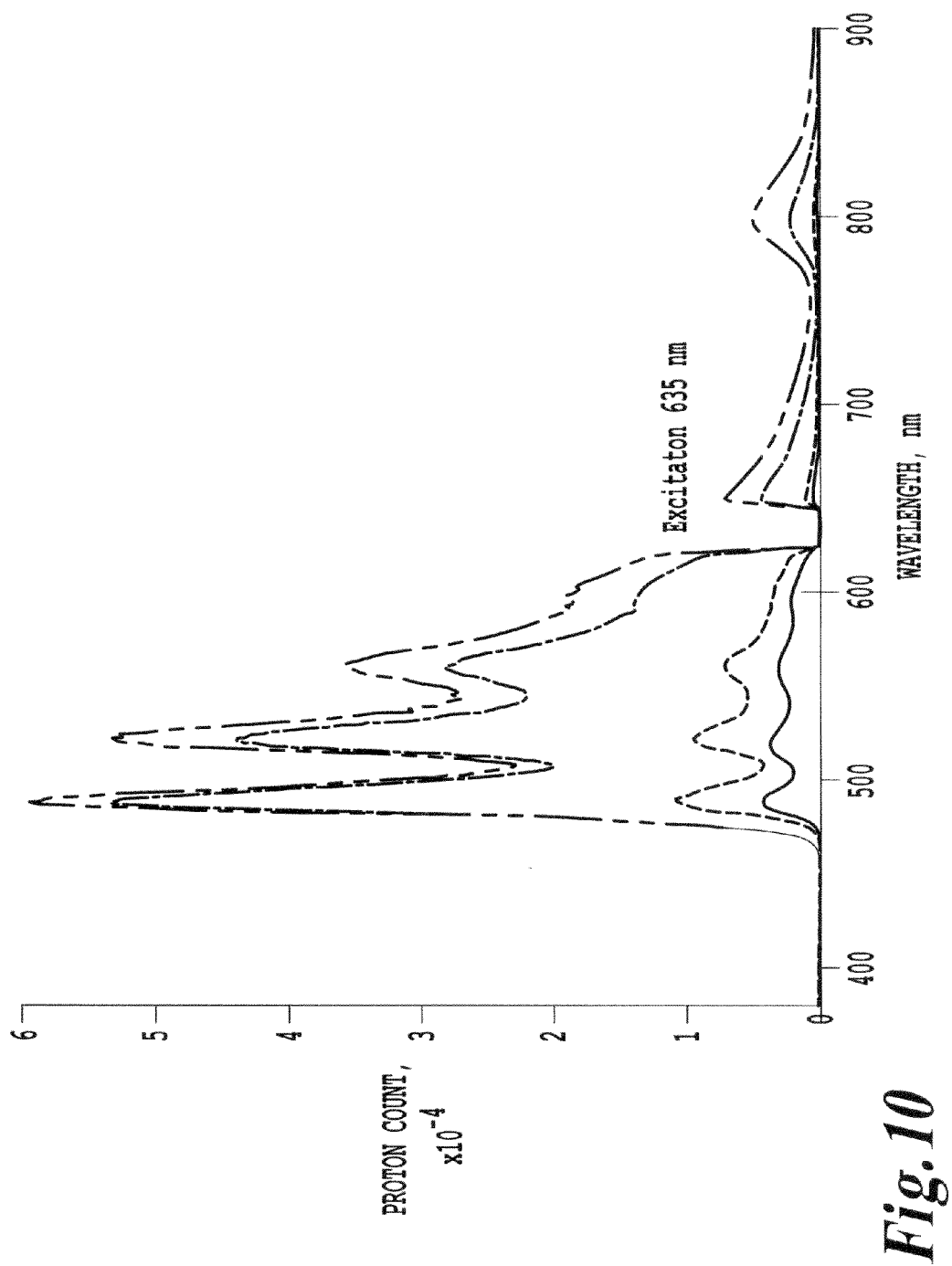
Figure 11A:
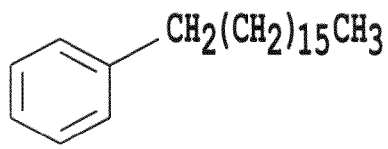
Figure 11B:
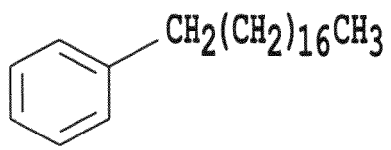
Figure 11C:
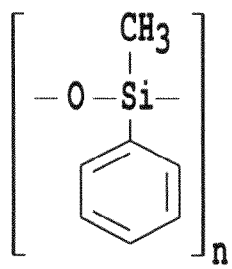
Figure 11D:
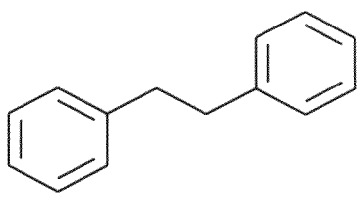
Figure 11E:
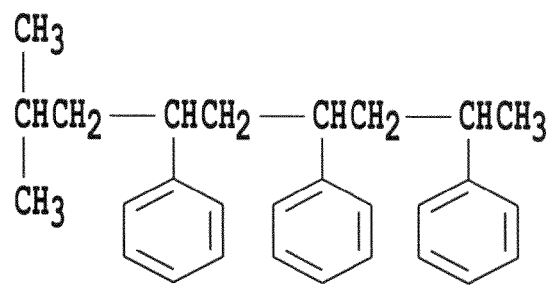
Figure 11F:
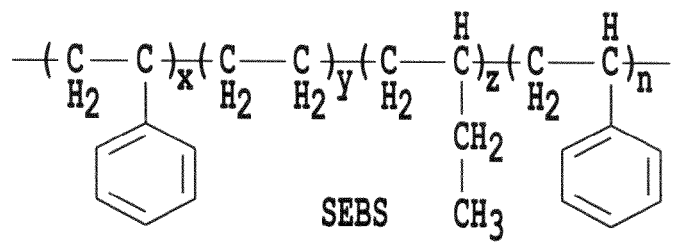
Figure 12A:
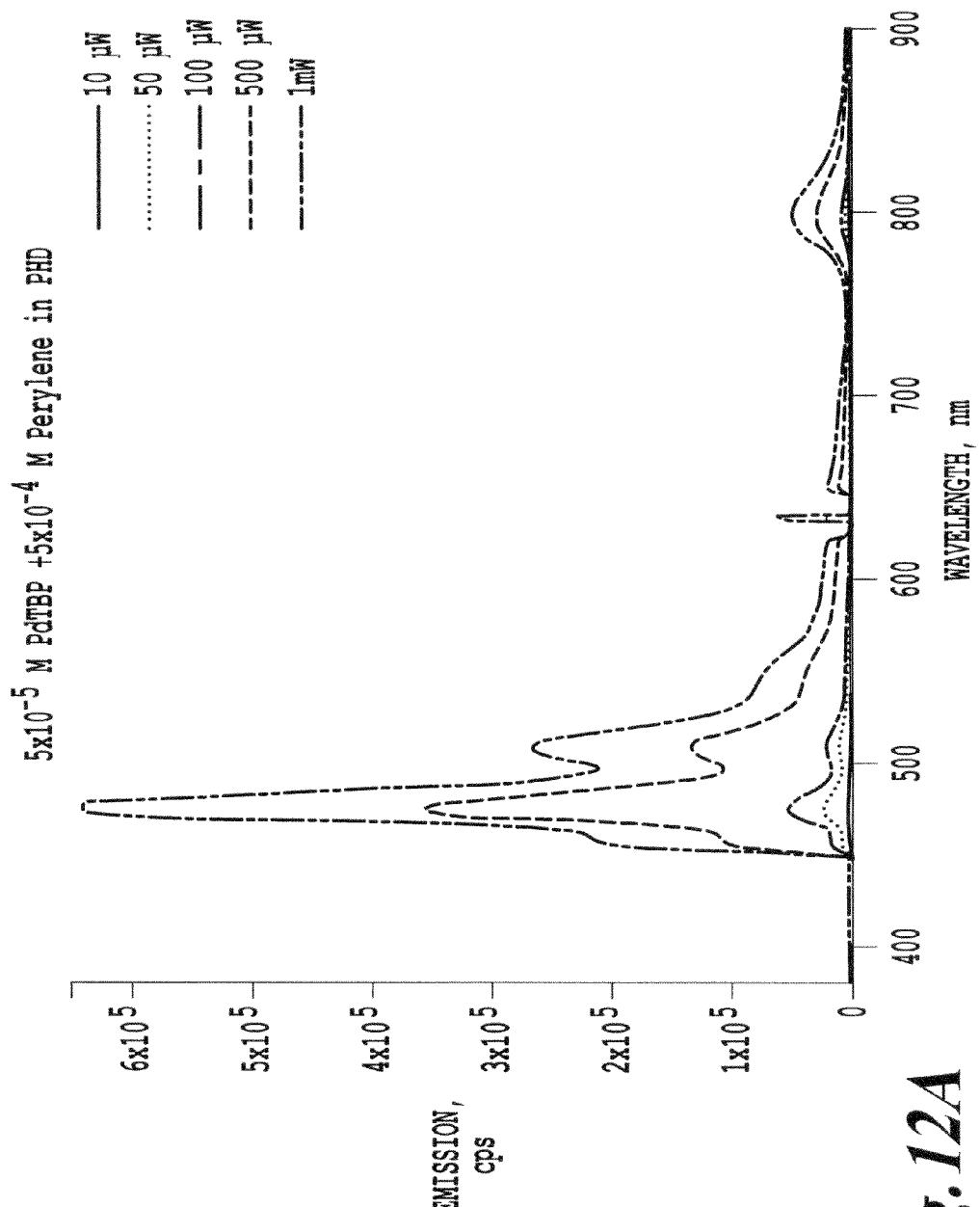
Figure 12B:
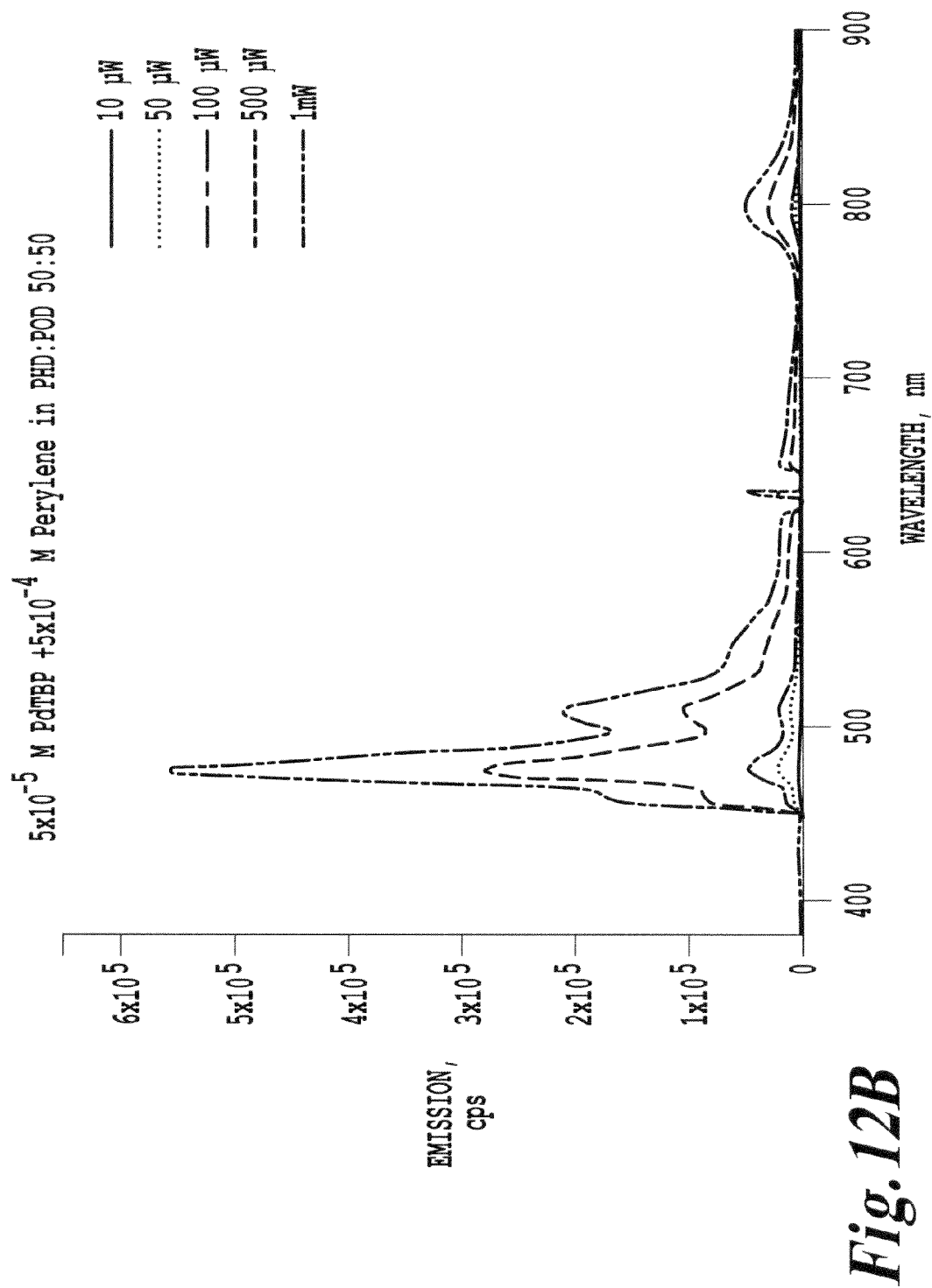
Figure 12C:
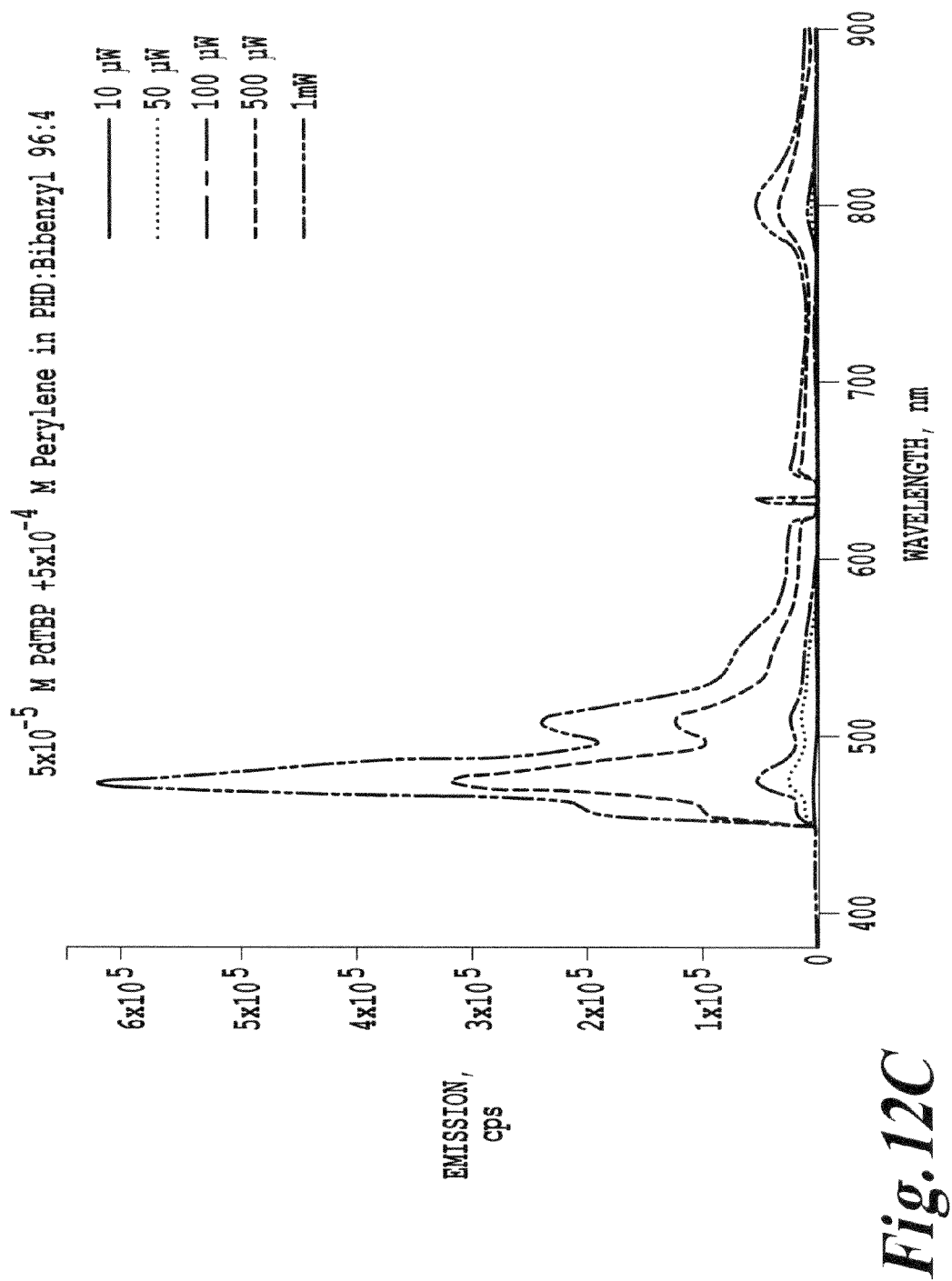
Figure 12D:
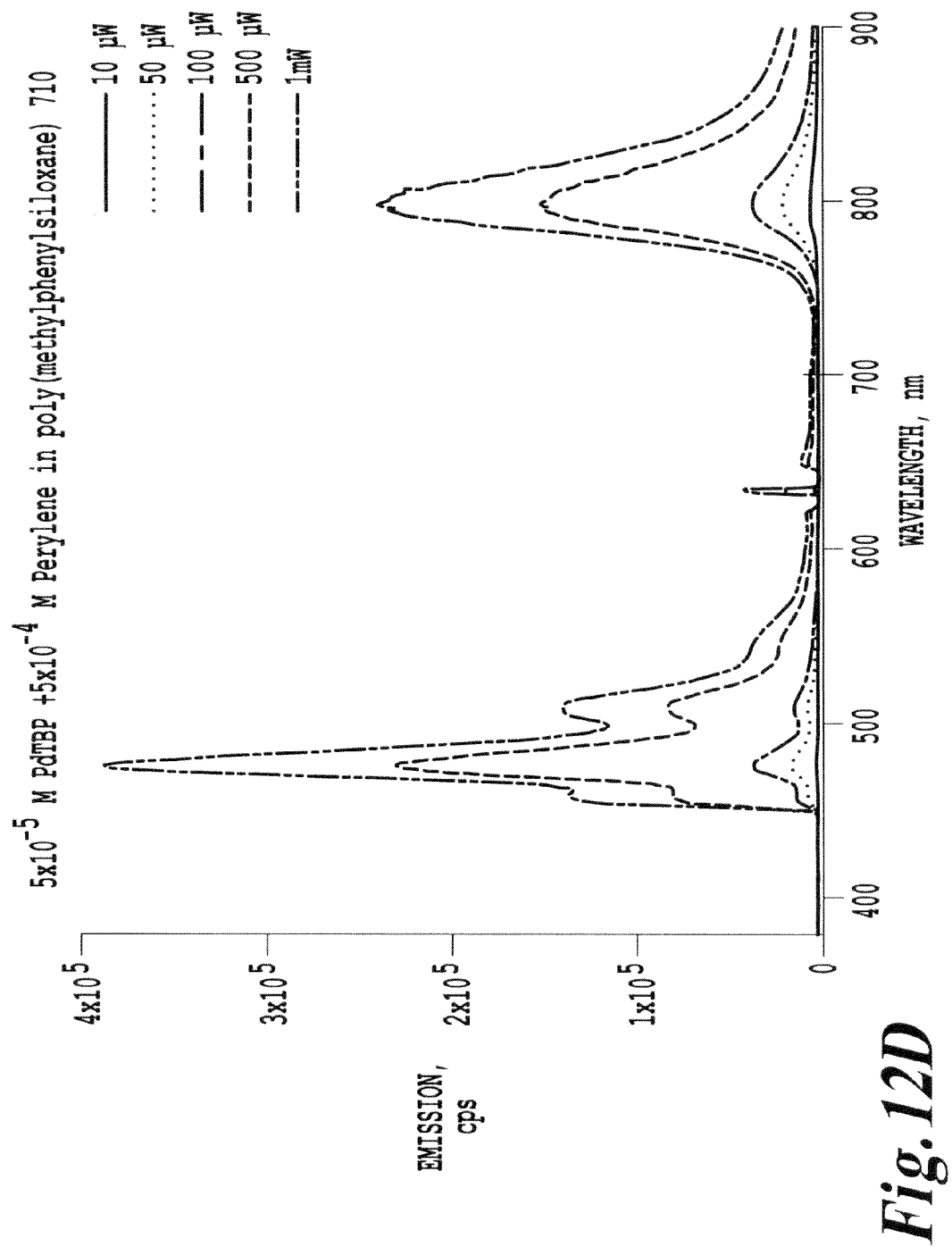
Figure 12E:
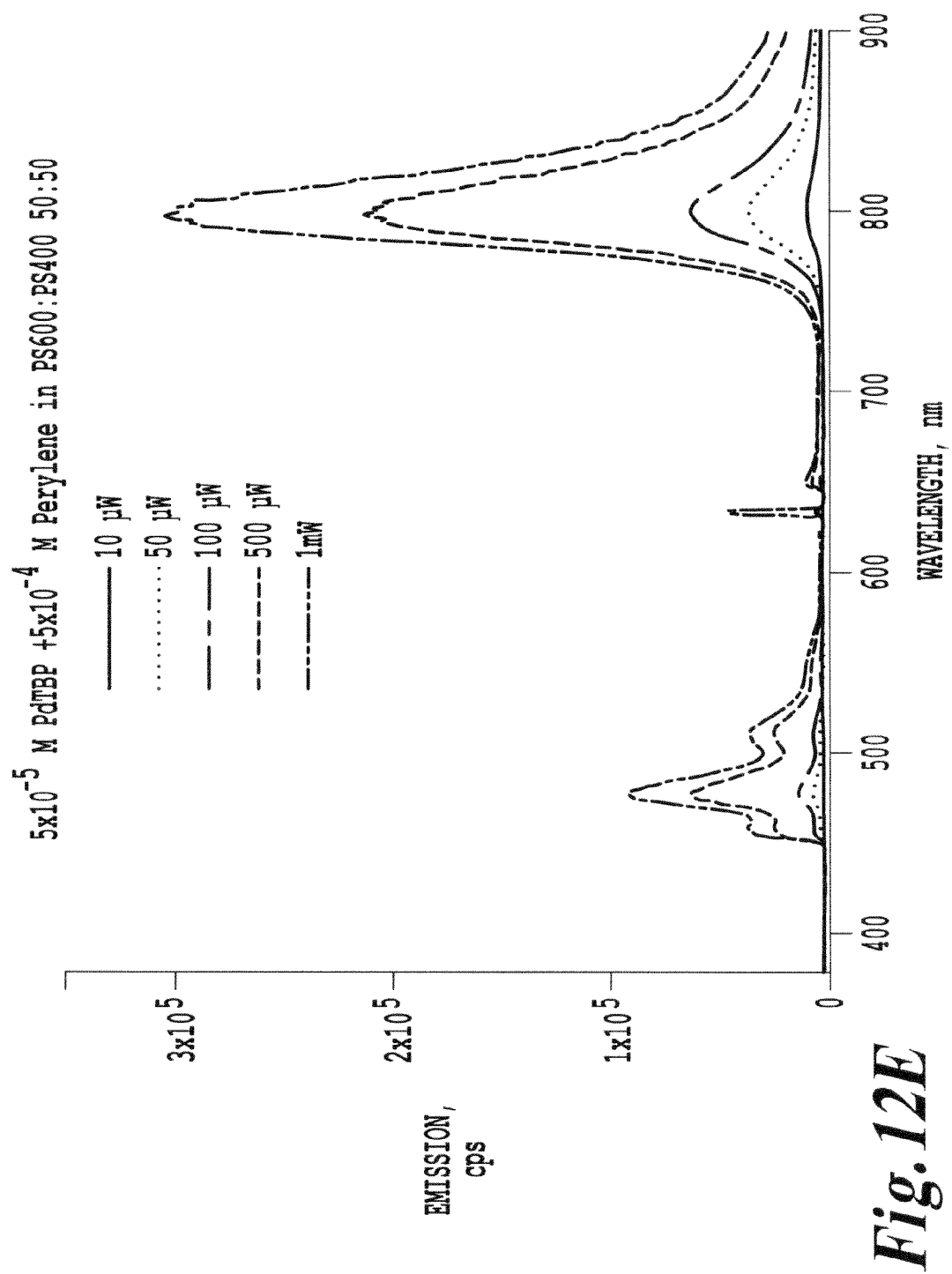
Figure 12F:
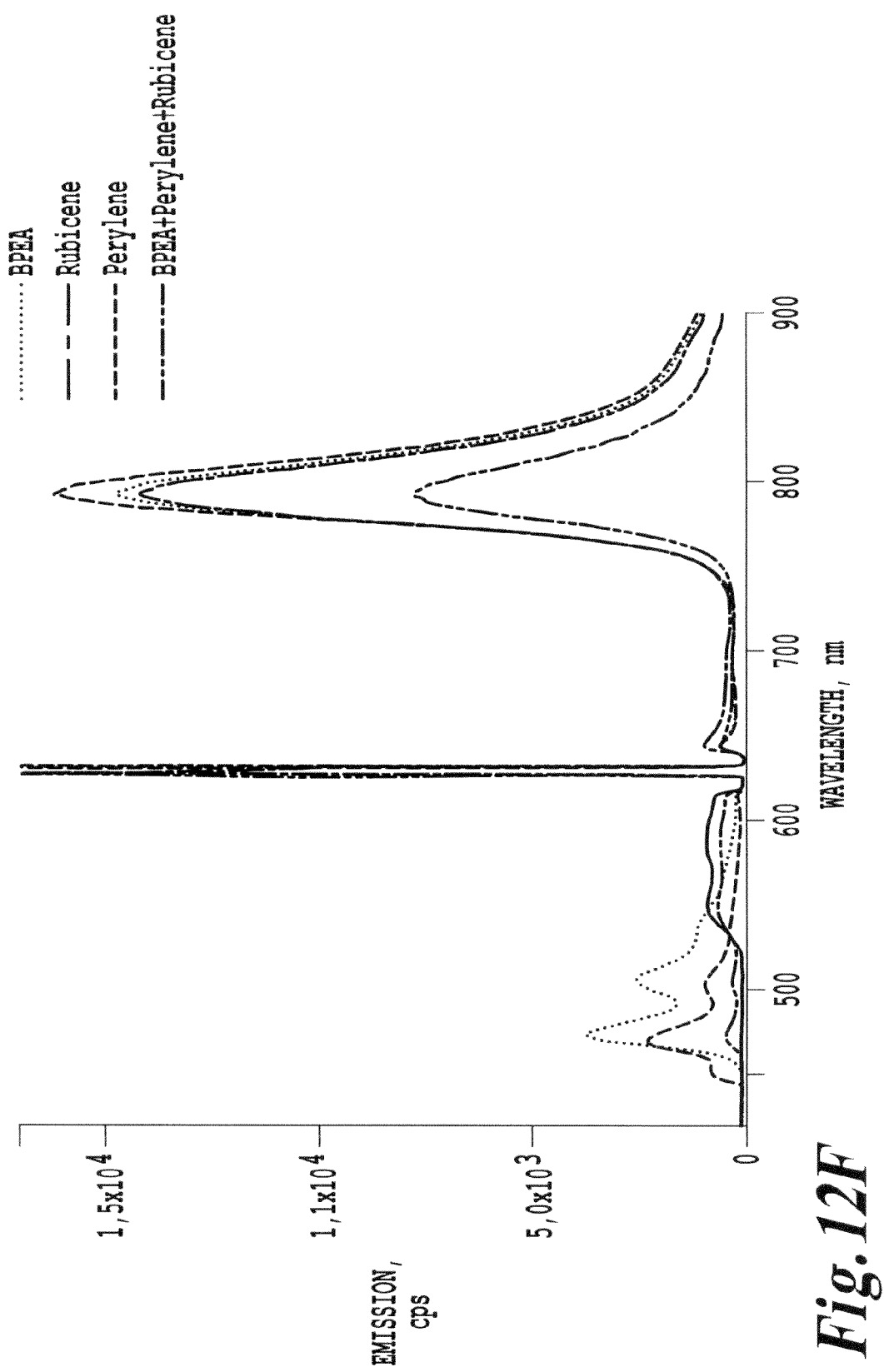

FIG. 5 shows upconversion spectra of the sensitizer (PhPdPc) with the emitter rubrene with varying sensitizer concentrations in a phenyl-heptadecane (PHD) matrix, namely
a) $5 \times 10^{-5}$ M PhPdPc+$5 \times 10^{-4}$M Rubrene
b) $1 \times 10^{-5}$ M PhPdPc+$5 \times 10^{-4}$ M Rubrene
Excitation 635 nm
c) $1 \times 10^{-5}$ M PhPdPc+$5 \times 10^{-4}$ M Rubrene with excitation 691 nm;

FIG. 6 shows upconversion spectra of the sensitizer (DOPdPc) with the emitter rubrene with the following concentration in a phenyl-heptadecane (PHD) matrix: $1 \times 10^{-4}$M PhPdPc+$1 \times 10^{-3}$M rubrene. The different curves correspond to different intensities of continuous wave excitation at 635 nm (cw at 635 nm);

FIG. 7 shows examples of emitter structures, namely
a) 3-Phenyl-perylene (PhP)
b) 3-(2,3-Difluoro-phenyl)-perylene (DFPP)
c) 2,6-Di-tert-butyl-1,3,5,7,8-penta-methyl-pyrromethene-difluoroborate complex (bodipy)
d) Rubicene;

FIG. 8 shows upconversion spectra of the couples: meso-tetraphenyl-tetrabenzoporphyrin palladium (PdTPTBP) with perylene, PdTPTBP with PhP, and PdTPTBP with DFPP; excitation wavelength 632 nm, 1 mW;

FIG. 9 shows upconversion spectra of the couple: PdTPTBP with rubicene. The excitation wavelength is 632 nm. Different curves correspond to different laser powers as described in the legend;

FIG. 10 shows upconversion spectra of the upconversion system with one sensitizer (PdTPTBP) and three emitters, namely perylene, BPEA (Bis(phenylethynyl)anthracene) and rubicene; with concentrations $5 \times 10^{-5}$ M PdTPTBP and $1.5 \times 10^{-4}$ M Rubicene, $1.5 \times 10^{-4}$ M Perylene and $1.5 \times 10^{-4}$ M BPEA in matrix PHD; excitation 632 nm, 1 mW.

FIG. 11 shows example structures of various matrix molecules, namely
a) 1-phenyl-heptadecane (PHD)—ethylene based oligomer,
b) 1-phenyl-octadecane (POD)—ethylene based oligomer, crystalline, which is added to PHD to control viscosity,
c) Poly(methylphenylsiloxane) 710®—viscosity 450-550 cSt (25° C.),
d) Bibenzyl—crystalline (small molecule)—added to PHD to control viscosity,
e) Oligostyrene (PS400),
f) Polystyrene-b-poly(ethylene/butylene)-b-polystyrene) block copolymer (SEBS);

FIG. 12 shows upconversion spectra of the upconversion system with sensitizer PdTPTBP and the emitter perylene in different matrices. The excitation wave length for all examples was 632 nm:
a) in 1-phenyl-heptadecane (PHD),
b) in a mixture 50:50 PHD:POD,
c) in a mixture 96:4 PHD:Bibenzyl,
d) in poly(methylphenylsiloxane) 71 ®,
e) in a mixture PS400:PS600 50:50, wherein different curves correspond to different laser power for excitation, as described in the legends,
f) upconversion systems PdTPTBP+BPEA; PdTPTBP+Perylene and PdTPTBP+Rubicene as well as PdTPTBP+BPEA+Perylene+Rubicene in SEBS; laser power 1 m W; Inset: the system PdTPTBP+Perylene excited with non-coherent (LED) source with 150 m W cm$^{-2}$.

Figure 13A:
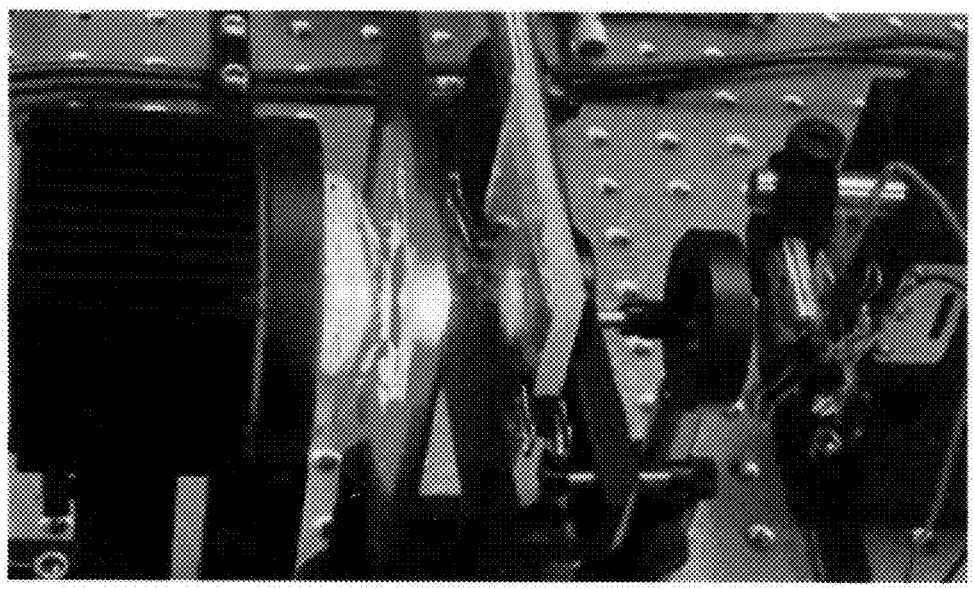
Figure 13B:
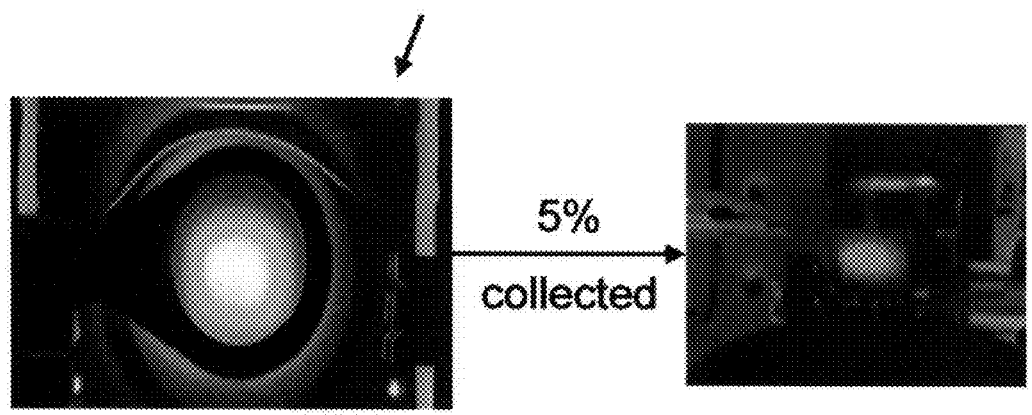
Figure 13C:
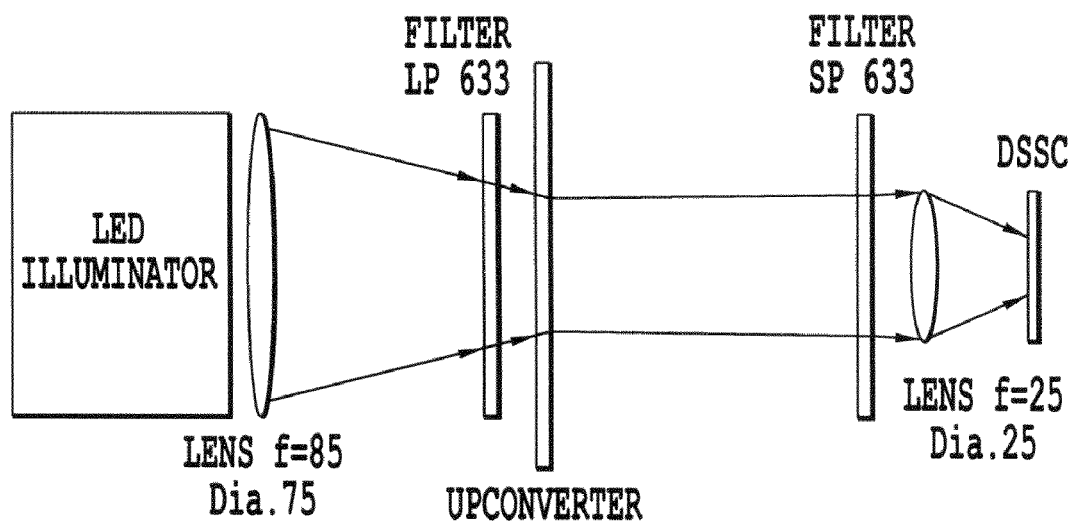
Figure 14A:
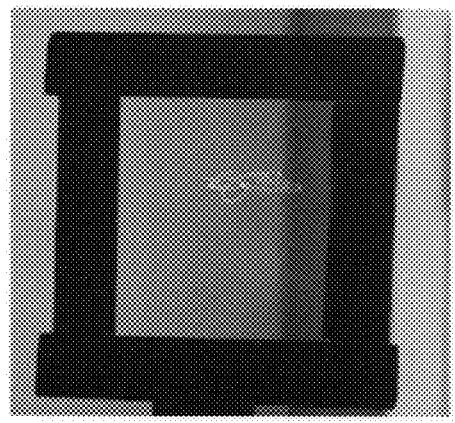
Figure 14B:
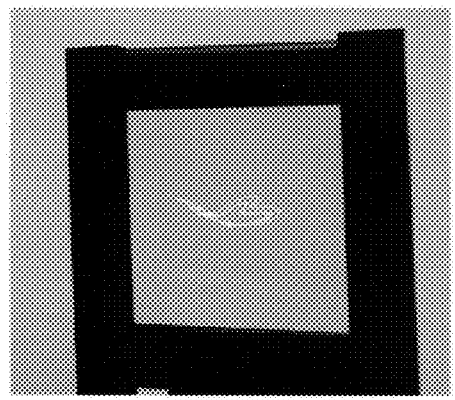
Figure 14C:
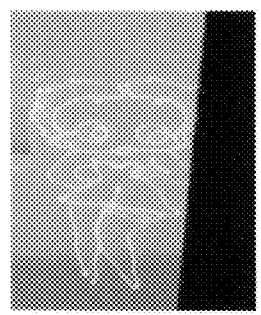
Figure 15A:
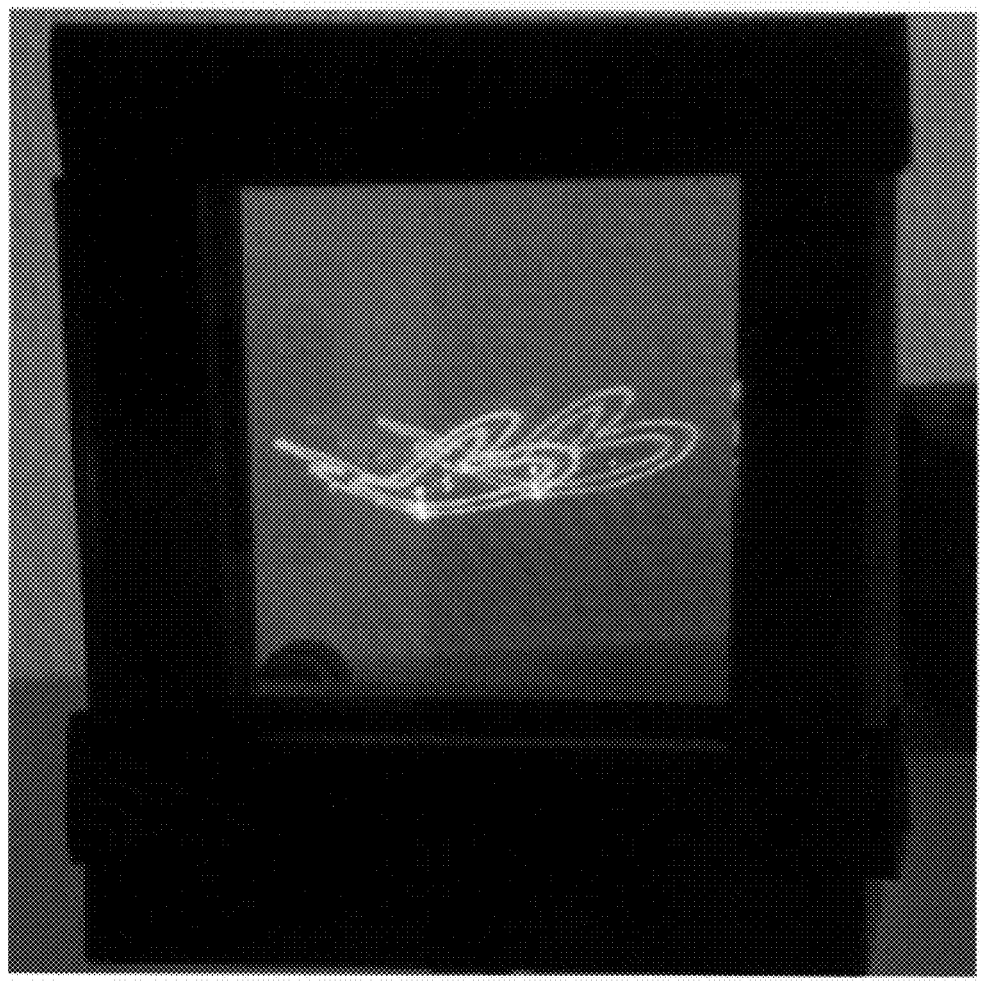
Figure 15B:
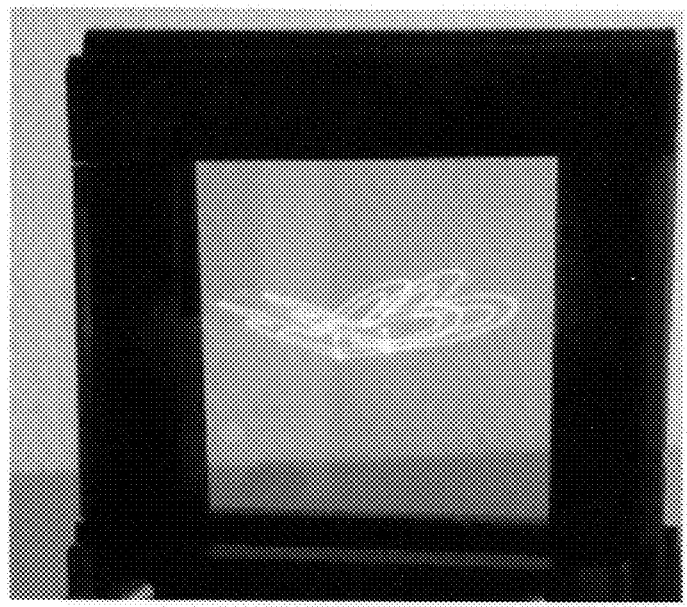
Figure 15C:
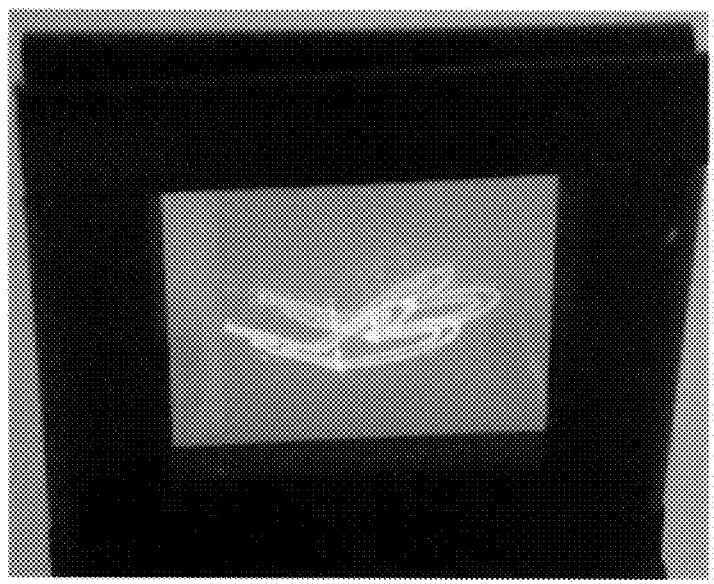
Figure 15D:
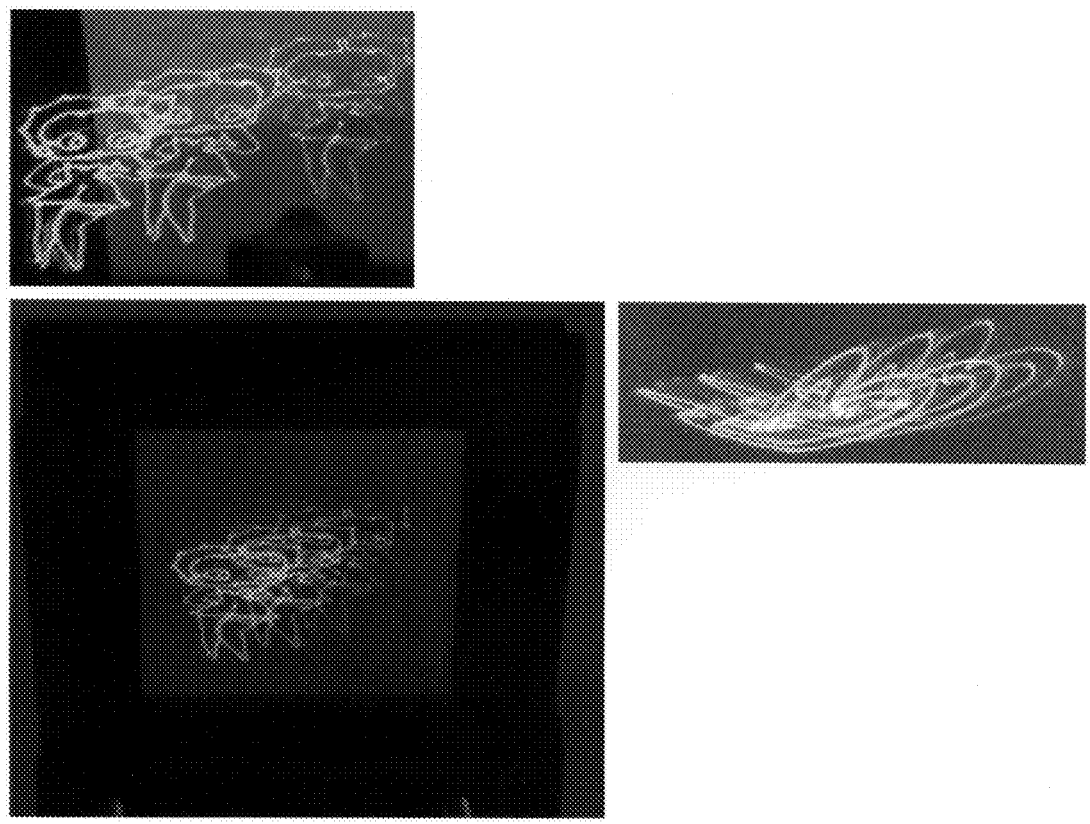

FIG. 13 shows an example for spectrum concentration working with non-focussed non-coherent light as directly combined with a dye sensitized solar cell. This is a proof-of-principle that a dye sensitized solar cell (DSSC) works with up-converted emission, non-coherent red LED, 90 m W cm$^{-2}$ and a large area (20×20 mm$^2$ upconverter; more specifically, the figure shows a set-up for DSSC characterization using upconverted non-coherent light, wherein FIG. 13a shows a photograph of the set-up; FIG. 13b shows a schematic representation of the set-up with a frontal photograph of the upconverter and the DSSC as irradiated with the 5% of the up-converted light collected; and FIG. 13c shows a spectrum of the LED used in the set-up. The upconverter included the upconversion system with one sensitizer (PdTPTBP) and three emitters, namely perylene, BPEA (Bis(phenylethynyl)anthracene) and rubicene; with concentrations $5 \times 10^{-5}$ M PdTPTBP and $1.5 \times 10^{-4}$ M Rubicene, $1.5 \times 10^{-4}$ M Perylene and $1.5 \times 10^{-4}$ M BPEA in matrix PHD;. The excitation wave length was 633-670 nm with a power of 90 m W cm$^{-2}$ on the upconverter. The upconverter had an active area of 20×20 mm$^2$, whereas the area of the DSSC was 10×10 mm$^2$; only 5% of the upconverted photons can be collected in this set-up, such that J$_{sc}$ is only 100 µA/cm$^2$. However, it is anticipated that by using wave guide structures, ca. 80% upconverted (UC) photons can be collected;

FIG. 14 shows examples for upconversion displays; two-dimensional displays include transparent displays in different colours, multilayer displays with one excitation source, pixelated displays with one excitation source and multilayer displays with two excitation sources, all of which can be realized in accordance with the present invention; more specifically, FIG. 14 shows transparent displays with different emission colours. The excitation is 635 nm. A) Blue upconversion couple: meso-Tetraphenyl-tetrabenzoporphyrin Palladium (PdTPTBP)+Perylene; B) A green upconversion couple: PdTPTBP+(Bis(phenylethynyl)anthracene) (BPEA); and C) shows a yellow upconversion couple: PdTPTBP+Rubicene;

FIG. 15 shows transparent displays as a demonstration for multilayer displays with different emission colours in the different layers. The excitation wave length is 635 nm.
A) Blue upconversion couple: meso-Tetraphenyl-tetrabenzoporphyrin Palladium (PdTPTBP)+Perylene and Green upconversion couple PdTPTBP+(Bis(phenylethynyl)anthracene) (BPEA);
B) Blue upconversion couple: meso-Tetraphenyl-tetrabenzoporphyrin Palladium (PdTPTBP)+Perylene and yellow upconversion couple: PdTPTBP+Rubicene;

C) Yellow upconversion couple: PdTPTBP+Rubicene and Green upconversion couple PdTPTBP+(Bis(phenylethynyl)anthracene) (BPEA)

D) Blue upconversion couple: meso-Tetraphenyl-tetrabenzoporphyrin Palladium (PdTPTBP)+Perylene and Green upconversion couple PdTPTBP+(Bis(phenylethynyl)anthracene) (BPEA) and Yellow upconversion couple: PdTPTBP+Rubicene. The displays shown are highly transparent single colour displays, which can be placed with a distance in between.

This may generate a three-dimensional effect whilst keeping the transparency at the same time. More than five layers are in principle possible.

Figure 16:
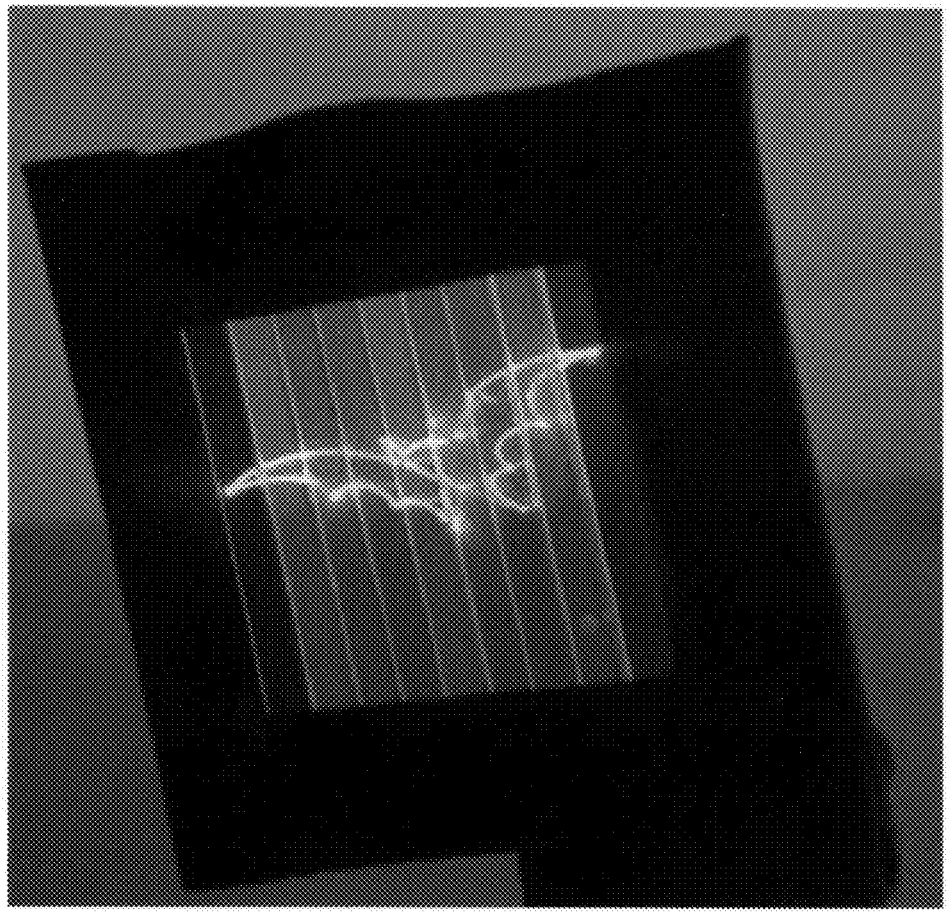

FIG. 16 shows the first prototype of a pixelated display. The excitation in this example is 635 nm. The blue up-conversion couple is meso-Tetraphenyl-tetrabenzoporphyrin Palladium (PdTPTBP)+Perylene; the green upconversion couple is PdTPTBP+(Bis(phenylethynyl)anthracene) (BPEA);

One yellow upconversion couple is PdTPTBP+Rubicene, and another yellow upconversion couple is PdTPTBP+Rubrene.

Figure 17A:
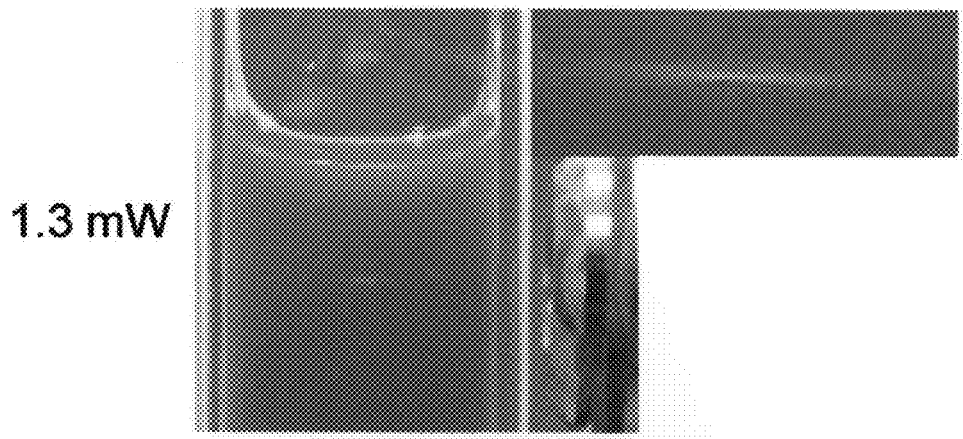

FIG. 17 shows examples for three-dimensional displays. As a proof of principle, a point/pixel of upconverted emission, i.e. an emissive pixel is created in a three-dimensional medium for upconversion. FIG. 17a shows the system $5 \times 10^{-5}$M PdTPTBP+$5 \times 10^{-4}$M BPEA in PHD; the excitation beam having 6 mm in diameter is focused with a numerical aperture (NA) of 0.25 in a spot with a length of ca. 1100 μm and a height of ca. 200 μm. The excitation wave length was 685 nm with a power of 1.3 mW.

Figure 17B:
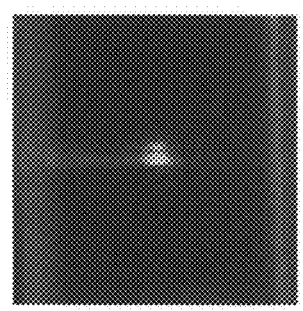

FIG. 17b shows $2.5 \times 10^{-5}$ M PdTPTBP+$5 \times 10^{-4}$ M BPEA in PHD. The excitation beam was 10 mm in diameter focused with a numerical aperture of 0.1 in a spot with a length of ca. 1000 μm and height of ca. 500 μm. The excitation wavelength was 685 nm, and the power was 15 mW. This is a proof-of-principle that also three-dimensional displays using the medium in accordance with the present invention are possible.

The features of the present invention disclosed in the specification, the claims and/or in the accompanying drawings, may, both separately, and in any combination thereof, be material for realizing the invention in various forms thereof.

The invention claimed is:

1. A display system comprising:
   a medium that is light-emitting upon excitation with light,
   a light source that provides excitation light directed at said medium,
   a control device that controls the distribution and the modulation of the excitation light to be directed at said medium,
   a computer that controls said light source and said control device,
   said medium being either in contact with at least one light transparent substrate, or said medium being shaped in a desired three-dimensional shape,
   wherein said medium is configured to up-convert photon energy and comprises at least two components and a matrix in which said at least two components are distributed, wherein said first component and said second component are organic compounds and act as a pair of sensitizer component and corresponding emissive component, respectively, and wherein said first component and said second component are distributed in said matrix which matrix is a solid, a gel or a fluid with a viscosity equal or higher than $0.59 \times 10{-3}$ Pa·s.

2. The display system according to claim 1, wherein said light source is selected from lasers, light emitting diodes (LEDs), organic light emitting diodes (OLEDs), the sun, wherein sun light has been collimated or coupled into an optical fiber that is directed towards said medium.

3. The display system according to claim 1, wherein said control device is selected from an acousto-optic modulator, a set of galvanic- or opto-mechanic- or piezo-scanned mirrors, a rotating polygon prism, a piezo-scanned up-conversion screen, a set of waveguides, and a set of masks and holograms for light-field modulation.

4. The display system according to claim 1, wherein said light source provides excitation light of a range of wavelengths.

5. The display system according to claim 1, wherein said display system comprises at least two light sources each of which provides excitation light of the same range of wavelengths or of different ranges of wavelengths.

6. The display system according to claim 1, wherein said first component absorbs light at a first wavelength region $w \leq \lambda 1 \leq x$, which first component acts as a sensitizer in said medium, wherein said second component emits light at a second wavelength region $y \leq \lambda 2 \leq z$, which second component acts as an emissive component in said medium, wherein $\lambda 2 \leq \lambda 1$, and wherein, upon absorption of light by said sensitizer component at said first wavelength region $\lambda 1$, said emissive component emits light at said second wavelength region $\lambda 2$.

7. The display system according to claim 6, comprising more than one pair of a sensitizer component and a corresponding emissive component, respectively.

8. The display system according to claim 7, wherein said pairs of sensitizer component and corresponding emissive component are different from each other in terms of their respective absorption and emission wavelengths, and each pair is present in said medium in a defined region.

9. The display system according to claim 6, wherein said emissive component's emitting light at said second wavelength region $\lambda 2$ is due to an up-conversion process based on direct or sequential two-photon excitation or on direct or sequential multi-photon excitation or on excitation of molecules populating high vibrational states, which up-conversion process occurs upon absorption of light by said first component at said first wavelength region $\lambda 1$.

10. The display system according to claim 6, wherein said emissive component's emitting light at said second wavelength region $\lambda 2$ is due to an up-conversion process based on a triplet-triplet annihilation process between photoexcited molecules of said emissive component and/or based on a triplet-triplet annihilation process between photo-excited molecules of said first component.

11. The display system according to claim 6, wherein said second wavelength region $\lambda 2$ is in the range 360-750 nm and said first wavelength region $\lambda 1$ is in the range 500-1600 nm.

12. The display system according to claim 1, wherein said medium comprises several layers, each layer being formed of said matrix, and in each layer a pair of a sensitizer component and a corresponding emissive component is present.

13. The display system according to claim 1, wherein said medium is in contact and distributed over at least one light transparent substrate.

14. The display system according to claim 13, wherein said medium is sandwiched between two substrates, at least one of which is light transparent.

15. The display system according to claim 13, wherein said substrate is a solid substrate, selected from glass, quartz, silicon nitride or carbide, sheets of any of the foregoing, or a flexible substrate, including a polymer sheet or a plastic foil.

16. The display system according to claim 1, wherein said medium is shaped in a ball, a cube, a letter, a numeral, a symbol, a logo, a parallelipied or an irregularly shaped object.

17. The display system according to claim 1, wherein said display system is an RGB display or a variable color display or a white display.

18. The display system according to claim 1, wherein said matrix is transparent in the range from 300 nm to 1600 nm.

19. The display system according to claim 1, wherein said fluid has a viscosity in the range of from $0.59 \times 10^{-3}$ to $1 \times 10^{6}$ Pa·s.

20. The display system according to claim 1, wherein said matrix is a solid with elastic, plastic, viscoelastic or viscoplastic properties.

21. The display system according to claim 1, wherein said matrix is an organic or inorganic glass with a viscosity $1 \times 10^{3}$ to $1 \times 10^{17}$ Pa·s.

22. The display system according to claim 1, wherein said matrix is a viscous liquid having a viscosity $\geq 0.59 \times 10^{-3}$ Pa·s.

23. The display system according to claim 22, wherein said matrix is made of one or several materials selected from the following organic oligomers, said oligomers having a finite number of monomeric units, and co-oligomers, said co-oligomers being comprised of a mixture of monomeric units, said monomeric units including, but not being limited to the class of substituted or non-substituted styrenes, phenylenes, phenylene diamines, phenylene diols, methyl methacrylates, phenols, acrylic acids, vinyls, including vinyl alcohol or vinyl chloride, lactic acids, carbohydrates, carbonates, imides, amides, including acryl amide, olefins, including ethylene and propylene, olefin oxides, including ethylene oxide or propylene oxide, olefin glycols, including ethylene glycol and propylene glycol, terephthalic acids, epsilon-caprolactams, urethanes, silanes, siloxanes and substituted and functionalised forms of any of the foregoing, and any combination thereof, said matrix additionally including one or several organic solvents or water to vary, adjust and control the viscosity of said medium.

24. The display system according to claim 1, wherein said matrix is an inorganic or organic gel having a viscosity $\geq 1 \times 10^{-1}$ Pa·s.

25. The display system according to claim 24, wherein said organic gel is an organic physical gel having non-covalent bonds or is a chemical gel having covalent bonds and being crosslinked wherein crosslinking is achieved by irradiation or by addition of crosslinking chemicals or both.

26. The display system according to claim 24, wherein said gel contains one or several linear and branched polymers, including, but not limited to poly(styrenes), (poly)phenylenes, poly(naphthalate), poly(terephthalate), poly(olefin-naphthalate) and poly(olefin-terephthalate), including poly(ethylene naphthalate), poly(ethylene terephthale), poly(ether imides), poly(ether ketones), poly(hydroxyl-butyrates), poly(phenylene diamines), poly(phenylene diols), poly(methyl methacrylates), poly(phenols), poly(acrylic acids), poly(vinyls), including poly(vinyl alcohols) or poly(vinyl chlorides), poly(lactic acids), poly(carbohydrates), poly(carbonate), poly(imide), poly(amide), including poly(acryl amide), olefins, including poly(ethylene) and poly(propylene), poly(olefin oxides), including poly(ethylene oxide) or poly(propylene oxide), poly(olefin glycols), including poly(ethylene glycol) and poly(propylene glycol), poly(terephthalic acids), poly(epsilon-caprolactam), poly(urethanes), polysilanes, poly(siloxanes) and combinations, mixtures or blends of any of the foregoing, said matrix additionally including one or several organic solvents or water to vary, adjust and control the viscosity of said medium.

27. The display system according to claim 1, wherein said matrix is a solid or glass having a viscosity $\geq 1 \times 10^{3}$ Pa·s.

28. The display system according to claim 27, wherein said matrix is made of a thermoplastic polymer or copolymer including block, alternating or graft copolymers, or a mixture thereof with one or several suitable solvent to control and adjust viscoelasticity or plastoelasticity of said medium.

29. The display system according to claim 27, wherein said matrix is made of polymer or copolymer, including block, alternating or graft copolymers with molecular weights from $10^{2}$ to $10^{9}$, including but not limited to poly(styrenes), (poly)phenylenes, poly(naphthalate), poly(terephthalate), poly(olefin-naphthalate) and poly(olefin-terephthalate), including poly(ethylene naphthalate), poly(ethylene terephthale), poly(ether imides), poly(ether ketones), poly(hydroxyl-butyrates), poly(phenylene diamines), poly(phenylene diols), poly(methyl methacrylates), poly(phenols), poly(acrylic acids), poly(vinyls), including poly(vinyl alcohols) or poly(vinyl chlorides), poly(lactic acids), poly(carbohydrates), poly(carbonate), poly(imide), poly(amide), including poly(acryl amide), olefins, including poly(ethylene) and poly(propylene), poly(olefin oxides), including poly(ethylene oxide) or poly(propylene oxide), poly(olefin glycols), including poly(ethylene glycol) and poly(propylene glycol), poly(terephthalic acids), poly(epsilon-caprolactam), poly(urethanes), poly(silanes), poly(siloxanes) and combinations, mixtures or blends of any of the foregoing, said matrix additionally including one or several organic solvents or water to vary, adjust and control the viscosity of said medium.

30. The display system according to claim 27, wherein said matrix is made of a thermosetting plastic.

31. The display system according to claim 30, wherein said thermosetting plastic is selected from polyester resins, epoxy resins, acrylics, polyimides, melamine resins, and phenol-formaldehyde resins.

32. The display system according to claim 1, wherein said matrix is made of a polymer elastomer.

33. The display system according to claim 32, wherein said matrix is made of a polymer elastomer selected from polyacrylic rubbers, silicone rubbers, fluorosilicone rubbers, fluoroelastomers, perfluoroelastomers, polyether-block-amides, and olefin rubbers.

34. The display system according to claim 1, wherein said matrix does not take part in a photon energy up-conversion process upon irradiation of said medium.

35. The display system according to claim 1, wherein said first component is a first organic compound and said second component is a second organic compound.

36. The display system according to claim 35, wherein said first and said second organic compounds are different compounds.

37. The display system according to claim 35, wherein said first and said second organic compound is a carbon-containing compound that is not a hydrogen-free chalcogenide of carbon, a derivative thereof, a salt-like carbide, a metallic carbide or a metal-carbonyl.

38. The display system according to claim 1, wherein said first component is neither covalently bonded nor complexed to said second component.

39. The display system according to claim 1, wherein said first component is covalently bonded or complexed to said second component.

40. The display system according to claim 1, wherein said first component is an organic dye or molecule having a populated triplet or mixed triplet-singlet state, a two-photon-absorbing (TPA)-dye, an optical limiting compound, another molecule with a populated triplet state or an optical limiting compound, including fullerene or carbon nanotubes.

41. The display system according to claim 40, wherein said organic dye is selected from the group comprising organic molecules having populated triplet states, for example but not limited to Li, Mg, Al, Ti, V(VO), Mn, Fe, Co, Ni, Cu, Zn, Ga, Ru, Pd, Ag, Re, Os, Ir, Pt, Pb, U(UO2), containing organic complexes, or any combination of the foregoing to ensure wavelength control.

42. The display system according to claim 1, wherein said second component is an organic dye.

43. The display system according to claim 1, wherein said first component is a first organic dye and said second component is a second organic dye, wherein said first and second organic dyes are the same or different.

44. The display system according to claim 43, wherein said first and/or said second organic dye is selected from the group comprising organic dyes with populated triplet states or capable of direct and/or sequential two-photon excitation, organic dyes capable of direct and/or multi-photon excitation, organic dyes capable of non-linear absorption and organic dyes capable of hot-band absorption.

45. The display system according to claim 43, wherein said first organic dye is selected from the group comprising compounds with a populated triplet state, including but not limited to porphyrins, including extended porphyrins, substituted porphyrins and any of the foregoing porphyrins containing metals including but not limited to Li, Mg, Al, Ti, V(VO), Mn, Fe, Co, Ni, Cu, Zn, Ga, Ru, Pd, Ag, Re, Os, Ir, Pt, Pb, U(UO2), phtalocyanines, including extended phtalocyanines, substituted phtalocyanines, and any of the foregoing phtalocyanins containing metals including but not limited to Li, Mg, Al, Ti, V(VO), Mn, Fe, Co, Ni, Cu, Zn, Ga, Ru, Pd, Ag, Re, Os, Ir, Pt, Pb, U(UO2), benzopyridines, benzopyrizines, quinolates and hydroxyquinolates, acetyl-acetonates, substituted benzopyridines, benzopyrizines, quinolates and hydroxyquinolates, acetyl-acetonates; —mixtures of any of the foregoing, and said second organic dye is selected from the group comprising compounds showing fluorescence emission in the range of from 360 to 750 nm, including fluorescent dyes showing fluorescence emission in the range of from 360 nm to 750 nm, including anthracenes, tetracenes, pentacenes, perylenes substituted anthracenes, tetracenes, pentacenes, perylenes phenyl (bi-, tri-phenyl)-bridged anthracenes, tetracenes, pentacenes, perylenes fluorenes, thiophenes, polyfluorenes and oligofluorenes, with or without any sidechain pattern and their copolymers, polyparaphenylenes, including polyparaphenylene vinylene, and polyphenyleneethinylenes.

46. The display system according to claim 43, wherein said first and said second organic dye are chosen such that a populated triplet state of said first organic dye is at an energy level allowing a triplet-triplet annihilation process and the subsequent transfer of energy to an excited singlet state of said second dye.

47. The display system according to claim 1, wherein combinations of said first and second component are selected from the following:
a) Green couple:
9,10-diphenylanthracene (DPA)/2,7,8,12,13,17,18-octaethylporphyrin Palladium (PdOEP);
b) Red couple: 9,10-Bis(phenylethynyl)anthracene (BPEA)/meso-Tetraphenyl-tetrabenzoporphyrin Palladium (PdTPTBP);
c) Near infra red couple: 9,10-Bis(phenylethynyl)naphthacene (BPEN)/meso-Tetraphenyl-octamethoxide-tetranaphtho[2,3]porphyrin Palladium (PdTPTNP);
d) Direct Red-to-Blue couple: Dibenz[de,kl]anthracene (Perylene)/meso-Tetraphenyl-tetrabenzoporphyrin Palladium (PdTPTBP);
e) Direct Infrared-to-Green couple: 4,4'-bis(5-tetracenyl)-1,1'-biphenylene (BPBT)/meso-Tetraphenyl-octamethoxide-tetranaphtho[2,3]porphyrin Palladium (PdTPTNP);
f) Infrared-to-yellow couple: 5,6,11,12-Tetraphenylnaphthacene (Rubrene)/Tetraantraporphyrin Palladium (PdTAP).

48. The display system according to claim 1, wherein said first and said second components are homogeneously distributed within said matrix.

49. The display system according to claim 1, wherein said first and said second components are encapsulated in particles having average dimensions in the range of from 5 nm to 999 µm, and such particles are homogeneously distributed within said matrix.

50. The display system according to claim 49, wherein said particles have average dimensions in the range of from 10 nm to 999 µm.

51. The display system according to claim 49, wherein said particles have a surface which is functionalized by functional groups to allow distribution of said particles within said matrix, said functional groups being H, —(CH2)nCH3, —(CH2)n-COOR, —(CH2)n-OR, —(CH2)n-SR, —(CH2)n-NR2, —((CH2)p-O)n-CH3, with R=H, substituted or non-substituted alkenyl or alkynyl, or halogen, or NO2, NH2, CN, SO3H, OH.

* * * * *